(12) United States Patent
Kuroda et al.

(10) Patent No.: US 7,492,995 B2
(45) Date of Patent: Feb. 17, 2009

(54) OPTICAL ELEMENT COMBINATION STRUCTURE AND OPTICAL FIBER STRUCTURE

(75) Inventors: Toshihiro Kuroda, Tsukuba (JP); Shigeyuki Yagi, Tsukuba (JP); Naoya Suzuki, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/529,490

(22) Filed: Sep. 29, 2006

(65) Prior Publication Data

US 2007/0025663 A1 Feb. 1, 2007

Related U.S. Application Data

(63) Continuation of application No. PCT/JP2005/003750, filed on Mar. 4, 2005.

(30) Foreign Application Priority Data

Mar. 31, 2004 (JP) ............................ 2004-102853
Jun. 8, 2004 (JP) ............................ 2004-170095

(51) Int. Cl.
*G02B 6/30* (2006.01)
(52) U.S. Cl. ................ 385/49; 385/15; 385/39
(58) Field of Classification Search ............. 385/15, 385/39, 49
See application file for complete search history.

(56) References Cited

U.S. PATENT DOCUMENTS 5,444,804 A * 8/1995 Yui et al. ............ 385/49

6,157,759 A 12/2000 Seo et al.

(Continued)

FOREIGN PATENT DOCUMENTS

JP 01-126608 5/1989

(Continued)

OTHER PUBLICATIONS

Chinese Official Action for Application No. 2005800102697, dated Nov. 9, 2007.

(Continued)

*Primary Examiner*—Jennifer Doan
(74) *Attorney, Agent, or Firm*—Antonelli, Terry, Stout & Kraus, LLP.

(57) ABSTRACT

An optical element combination structure in which an optical fiber and an optical waveguide are combined with each other and which can reduce fluctuation of coupling loss due to a change in environmental temperature is provided. The present invention relates to an optical element combination structure in which an optical fiber and an optical waveguide are combined with each other. An optical element combination structure according to the present invention 1 comprises an optical fiber 2 and a substrate 6 on which an optical waveguide 4 is formed. The substrate 6 has a V-shaped cross-sectional groove 8 formed so that the optical fiber and the optical waveguide are aligned with each other, and a recess 10 formed on a waveguide side relative to the groove 8. The optical fiber is secured to the V-shaped cross-sectional groove 8 with an adhesive 22. A tip 18 of the optical fiber 2 protruding into the recess 10 and the optical waveguide 4 are coupled to each other with a coupling agent with which the recess and a space between the optical fiber and the optical waveguide are filled.

29 Claims, 18 Drawing Sheets

U.S. PATENT DOCUMENTS

| | | | |
|---|---|---|---|
| 6,529,670 B1 * | 3/2003 | Saito et al. | ............... 385/137 |
| 6,757,471 B2 | 6/2004 | Jeong et al. | |
| 2006/0215964 A1 * | 9/2006 | Kuroda et al. | ............... 385/49 |

FOREIGN PATENT DOCUMENTS

| JP | 09-269434 | 10/1997 |
|---|---|---|
| JP | 11-194239 | 7/1999 |
| JP | 2000-105324 | 4/2000 |
| JP | 2000-131556 | 5/2000 |
| JP | 2001-281479 | 10/2001 |
| JP | 2003-322744 | 11/2003 |
| JP | 2004-062064 | 2/2004 |
| KR | 1999-8735 | 2/1999 |
| KR | 2003-37285 | 5/2003 |
| WO | WO 02/23239 A1 | 3/2002 |

OTHER PUBLICATIONS

Korean Official Action for Application No. 10-2006-7020001, dated Nov. 15, 2007.

* cited by examiner

OPTICAL ELEMENT COMBINATION STRUCTURE AND OPTICAL FIBER STRUCTURE

This application is a Continuation application of International (PCT) Application No. PCT/JP2005/003750, filed on Mar. 4, 2005.

FIELD OF THE INVENTION

The present invention relates to an optical fiber structure and in particular to one which is an optical element combination structure in which an optical fiber and an optical waveguide are coupled to each other.

Further, the present invention relates to an optical fiber structure in which an optical fiber is positioned by a V-shaped cross-sectional groove provided on a substrate and the fiber is fixed between the substrate and a holding member by an adhesive.

BACKGROUND OF THE INVENTION

Conventionally, as an example of an optical fiber structure, an optical element combination structure (an optical module) in which a V-shaped cross-sectional groove and an optical waveguide are integrally formed and an optical fiber disposed on the V-shaped cross-sectional groove and the optical waveguide are coupled to each other has been known (Please refer to, for example, Patent Publications 1-3 below). Now, such an optical element combination structure will be explained by referring to optical element combination structures disclosed in the Patent Publications 1 and 3 as examples.

FIG. 7 shows an optical element combination structure disclosed in the Patent Publication 1. An optical element combination structure 70 has an optical fiber 72 and a substrate 76 formed with an optical waveguide 74 to be aligned with the fiber 72. The substrate 76 has a V-shaped cross-sectional groove 78 formed so that, when the fiber 72 is disposed onto the V-shaped cross-sectional groove 78, the fiber 72 and the waveguide 74 are aligned with each other, and a recess 80 formed on a waveguide side relative to the V-shaped cross-sectional groove 78.

The fiber 72 is disposed onto the V-shaped cross-sectional groove 78 so that a tip of the fiber 72 protrudes into the recess 80, and the tip is abutted to an input of the waveguide 74. This allows the fiber 72 and the waveguide 74 to be aligned with each other, namely, enables them to be coaxially centered. Then, the fiber 72 is fixed to the V-shaped cross-sectional groove 78 with an adhesive. Thus, the alignment between the fiber 72 and the waveguide 74 can be maintained.

FIG. 8 shows an optical element combination structure disclosed in the Patent Publication 3. An optical element combination structure 90 has an optical fiber 91, a substrate 93 formed with an optical waveguide 92 to be aligned with the fiber 91, a fixing groove 94 for fixing the fiber 91 thereon, and an adhesive-separating groove 95 formed across the fixing groove 94. Between the fiber 91 and the waveguide 92, a small mount of an ultraviolet curing type adhesive 96 for connecting end surfaces thereof is dropped. Between the fiber 91 and the substrate 93, a fixing adhesive 97 is applied.

In a state that the fiber 91 and the waveguide 92 are coaxially centered, the ultraviolet curing type adhesive 96 dropped between the fiber 91 and the waveguide 92 is cured so that the fiber 91 and the waveguide 92 are firmly adhered to each other. Then, the fixing adhesive 97 is cured so that the fiber 91 and the substrate 93 are adhered to each other. Since the end-surface-connecting adhesive 96 and the fixing adhesive 97 are separated from each other by an adhesive-separating groove 95, even though the fixing adhesive 97 is shrunk when it is cured, the end-surface-connecting adhesive 96 is prevented from being withdrawn by the fixing adhesive 97 so that the alignment between the fiber 91 and the waveguide 92 can be prevented from shifting. A value of coupling loss of the optical element combination structure 90 at a room temperature of 25° C. is maintained equal to or less than 0.5 dB.

Further, conventionally, as another example of an optical fiber structure, an optical fiber structure in which a fiber is positioned by a V-shaped cross-sectional groove formed on a substrate and the fiber is fixed between the substrate and the holding member with an adhesive has been known. Such an optical fiber structure is known, for example, as an optical fiber array; an optical element combination structure (an optical module) in which a V-shaped cross-sectional groove and an optical waveguide are integrally formed and the optical waveguide and an optical fiber positioned on the V-shaped cross-sectional groove are coupled to each other; and an optical element combination structure (an optical module) in which an optical fiber array and an optical waveguide are coupled to each other (Please refer to, for example, Patent Publication 4 below).

FIG. 26 is a partially cross-sectional front view of an example of an optical element combination structure (an optical module) in which optical fibers positioned on respective V-shaped cross-sectional grooves and an optical waveguide are coupled to each other. FIG. 27 is a cross-sectional view taken along the line XXVII-XXVII in FIG. 26. An optical element combination structure 200 has upstream optical fibers 202 each having an end surface 202a and extending in a longitudinal direction; a downstream optical fiber 204 having an end surface 204a opposed to the end surfaces 202a of the upstream fibers 202 and extending in the longitudinal direction; and an optical waveguide 206 disposed between the upstream fibers 202 and the downstream fiber 204 so that a light is transmitted from the former to the latter. The combination structure 200 further has a substrate 210 provided with V-shaped cross-sectional grooves for receiving and positioning the upstream fibers 202 and the downstream fiber 204; holding blocks 212, 214 respectively covering the upstream fibers 202 and the downstream fiber 204 from their upper sides and pushing them against the substrate 210; and an adhesive 216 with which spaces formed between any two of the substrate 210, the fibers 204, 206 and the holding blocks 212, 214 are filled to fix them to each other. The holding blocks 212, 214 respectively have contact surfaces 218 contacting the upstream fibers 202 and the downstream fiber 204.

In this combination structure 200, lights passing through the upstream fibers 202 are transmitted via the waveguide 206 to the downstream fiber 204.

Patent Publication 1: Japanese Patent Laid-open Publication No. 1-126608 (FIG. 1)

Patent Publication 2: Japanese Patent Laid-open Publication No. 2001-281479 (Paragraph 0017 and FIG. 1)

Patent Publication 3: Japanese Patent Laid-open Publication No. 2000-105324 (claim 1, Paragraph 0052 and FIG. 1b)

Patent Publication 4: Japanese Patent Laid-open Publication No. 2003-322744 (FIGS. 1-5)

DISCLOSURE OF THE INVENTION

Problem to be Solved by the Invention

Power loss of the transmitted light, referred to coupling loss, arises, for example, in the combination structure 200 disclosed in Patent Publication 4, when light is transmitted from the upstream fibers 202 to the waveguide 206 and when light is transmitted from the waveguide 206 to the downstream fiber 204. This coupling loss (10 $\log_{10}$ (Po/Pi)) is a ratio, in decibel unit, of a power of light (Po) of the downstream fiber with respect to a power of light (Pi) of the upstream fiber.

Coupling loss of the combination structure 200 shown in FIGS. 26 and 27, specifically, coupling loss between the upstream fiber 200 and the waveguide 206 or coupling loss between the waveguide 206 and the downstream fiber 204, may be varied depending on a change in viscosity of the adhesive and an environmental temperature. Referring to FIGS. 28 and 29, this variation will now be explained. FIG. 28 shows a relationship between values of viscosity of the adhesive 216 and values of coupling loss at an environmental temperature of 25° C. which is considered to be substantially the same temperature as that when the fibers 202, 204 are fixed in the V-shaped cross-sectional grooves 208 of the substrate 210. FIG. 29 shows a relationship between values of viscosity of the adhesive 216 and measured fluctuation values of coupling loss while an environmental temperature is changed from −40° C. to +85° C.

As seen from FIGS. 28 and 29, when a value of viscosity of the adhesive 216 is relatively low, a value of coupling loss of the combination structure 200 at +25° C. is relatively low as shown in FIG. 28, while a fluctuation value of coupling loss thereof while a temperature is changed from −40° C. to +85° C. is relatively high as shown in FIG. 29. As a result, even when a value of coupling loss of the combination structure 200 at 25° C. is low, values of coupling loss thereof at −40° C. and +85° C. are relatively high.

Further, when a value of viscosity of the adhesive 216 is relatively high, a value of coupling loss of the combination structure 200 at +25° C. is relatively high, while fluctuation values of coupling loss thereof while a temperature is changed from −40° C. to +85° C. is relatively low as shown in FIG. 29. As a result, values of coupling loss of the combination structure 200 at temperatures of +25° C., −40° C. and +85° C. are relatively high and such values do not tend to vary.

FIG. 30 shows a relationship between values of elastic module and those of viscosity of the adhesive. As seen from FIG. 30, there is a proportional relationship between values of elastic module and those of viscosity of the adhesive; namely, the higher a value of viscosity of the adhesive is, the higher a value of elastic module thereof is. Thus, values of coupling loss vary not only depending on changes in viscosity of the adhesive and an environmental temperature but also depending on a change in elastic module of the adhesive.

Further, recently, use of optical internet wiring networks have expanded to many homes. In providing each home with an optical internet wiring, a method of branching an optical fiber on a wiring-supply side into a plurality of optical fibers by an optical splitter and withdrawing the branched fiber into each home has become common. As this optical splitter, the above-mentioned optical element combination structure in which an optical fiber and an optical waveguide are coupled to each other is used. Since the optical splitter is disposed, for example, in a box mounted on an electric pole near each home, it may be affected by an environmental temperature. Especially, a temperature in such a box may change more than a change in atmosphere temperature. As a result, loss of light transmitted to each home through an optical splitter using the above-mentioned optical element combination structure, namely, coupling loss of the combination structure, may change or increase depending on a change in environmental temperature.

Accordingly, while an environmental temperature and a temperature of the combination structure are changed, for example, from −40° C. to +85° C., it is preferable that a value of coupling loss of the optical element combination structure 200 be equal to or less than a predetermined level. Such a predetermined level is preferably 0.6 dB, more preferably 0.5 dB, and much more preferably 0.4 dB. Further, in the optical element combination structure 90 disclosed in Patent Publication 3, a value of coupling loss of 0.5 dB has been achieved at 25° C., but it is desirable to reduce such a value of coupling loss and preferably a value of coupling loss is equal to or less than 0.2 dB.

It is therefore a first object of the present invention to provide an optical element combination structure in which an optical fiber and an optical waveguide are combined with each other and which can reduce a fluctuation value of coupling loss; namely, a fluctuation value of light transmitting loss, due to a change in environmental temperature.

Further, it is a second object of the present invention to provide an optical element combination structure which can decrease coupling loss thereof when an adhesive having relatively high viscosity is used.

Further, it is a third object of the present invention to provide an optical fiber structure which allows coupling loss thereof to be equal to or less than a predetermined level while a temperature is changed from −40° C. to +85° C.

Means for Solving the Problem

The inventor reviewed in detail fluctuation of coupling loss of the above-mentioned optical element combination structure and found that a change in environmental temperature causes an adhesive between an optical fiber and a V-shaped cross-sectional groove to be expanded or constricted so that the fiber is moved relative to the V-shaped cross-sectional groove; which leads to relative movement between a tip of the fiber and an optical waveguide and misalignment thereof occurs so that a value of coupling loss of the combination structure increases.

To achieve the above-mentioned first object, an optical element combination structure according to the first aspect of the present invention is an optical element combination structure in which an optical fiber and an optical waveguide are combined with each other comprising an optical fiber and a substrate on which an optical waveguide to be aligned with the optical fiber is formed; wherein the substrate has a V-shaped cross-sectional groove opening upward and formed so that, when the optical fiber is disposed onto the V-shaped cross-sectional groove, the optical fiber and the optical waveguide are aligned with each other, and a recess forming a space on a waveguide side relative to the V-shaped cross-sectional groove; the space opening upward and extending downward beyond the V-shaped cross-sectional groove; wherein the optical fiber is disposed onto the V-shaped cross-sectional groove so that a tip of the optical fiber protrudes into the recess, and is secured to the V-shaped cross-sectional groove with a fiber adhesive; and wherein the tip of the optical fiber and the optical waveguide are coupled to each other with an fiber-coupling agent with which the recess and a space between the optical fiber and the optical waveguide are filled.

In this optical element combination structure, the fiber is disposed onto the V-shaped cross-sectional groove so that the tip of the fiber protrudes into the recess, and the tip of the fiber is abutted to the waveguide. This allows the fiber and the waveguide to be aligned with each other, namely, to become coaxially aligned. Actually, there is a slight gap between the fiber and the waveguide. Then, the fiber and the V-shaped cross-sectional groove are secured to each other with the fiber adhesive. Further, a space between the tip of the fiber and the waveguide as well as the recess are filled with the fiber-coupling agent so that the tip of the fiber and the waveguide are coupled to each other. This allows the alignment between the fiber and the waveguide to be maintained.

Specifically, due to a change in environmental temperature, the fiber adhesive, with which a space between the fiber and the V-shaped cross-sectional groove is filled, is expanded or constricted. In an optical element combination structure in the prior art, relative movement between the tip of the fiber and the waveguide occurs to allow the fiber and the waveguide to be misaligned so that light transmitting loss or coupling loss increases. On the other hand, in the optical element combination structure according to the present invention, since the tip and the waveguide are coupled to each other by the fiber-coupling agent, such relative movement between the fiber and the waveguide is restricted. This allows coupling loss of the combination structure to be reduced.

Further, since the recess is formed on a waveguide side relative to the V-shaped cross-sectional groove and the tip of the fiber is disposed so that it protrudes into the recess, even when the fiber adhesive and the fiber-coupling agent are different from and contact each other, coupling loss of the combination structure can be reduced as will be apparent from an explanation of an embodiment later. The recess can be formed at the same time when a step of removing a slope surface of the V-shaped cross-sectional groove by dicing and so on is performed, which slope surface is formed when the V-shaped cross-sectional groove is formed by anisotropic etching. Thus, it is neither necessary to bother to form an adhesive separating groove 95 disclosed in Patent Publication 3 nor necessary to add another step of forming only the recess. An end surface of the waveguide can be made to be a mirror surface by appropriately selecting an abrasive condition at a dicing process. This allows an amount of reflective attenuation at the end surface to be reduced and thus coupling loss of the combination structure can be much reduced.

In the embodiment of the optical element combination structure according to the first aspect of the present invention, preferably, the substrate further has an upper surface on which the V-shaped cross-sectional groove is formed; the combination structure further comprising a holding member disposed to sandwich the optical fiber with the upper surface and spaced from the upper surface, the holding member having a wide groove which is disposed over the optical fiber and is wider than an outer diameter of the optical fiber; wherein, with the fiber adhesive, a space between the wide groove and the optical fiber and a space between the holding member and the upper surface are filled.

In this optical element combination structure, the fiber is secured to the substrate by the fiber adhesive with which a space between the fiber and the V-shaped cross-sectional groove is filled, and the fiber-coupling agent with which a space between the fiber and the wide groove of the holding member is filled. Namely, the fiber is generally supported at three locations; one lower location where a space between the fiber and the V-shaped cross-sectional groove is filled with the fiber adhesive; and two upper locations where spaces between portions on the opposed sides relative to the fiber and the wide groove are filled with the fiber-coupling agent. When the fiber adhesive is expanded or constricted due to a change in environmental temperature, relative movement of the fiber with respect to the V-shaped cross-sectional groove is restricted and thus relative movement of the tip of the fiber with respect to the waveguide is also restricted. As a result, the coupling loss of the combination structure can be much reduced.

In the above-mentioned optical element combination structure which is the embodiment according to the first aspect, the fiber adhesive and the fiber-coupling agent may be the same adhesives or different compounds. It is preferable that values of elastic modulus of the fiber adhesive and the fiber-coupling agent are within a range of 0.01-0.5 GPa and values of coefficient of linear expansion thereof are within a range of 40-300 ppm/° C. Further, it is preferable that values of viscosity of the fiber adhesive and the fiber-coupling agent are within a range of 100-1,000 mPa·s.

In the above-mentioned optical element combination structure which is the embodiment according to the first aspect, preferably, the fiber adhesive and the fiber-coupling agent are the same adhesive. If the fiber adhesive and the fiber-coupling agent are the same adhesive, since the number of compounds used for adhesion and coupling thereof is only one, the manufacturing process can be simplified.

In the embodiment according to the first aspect of the present invention, preferably, the combination structure further comprises a sealer applied over the tip of the optical fiber and the fiber-coupling agent, wherein a value of elastic modulus of the sealer is greater than those of elastic modulus of the fiber adhesive and the fiber-coupling agent.

In this optical element combination structure, the fiber adhesive with which a space between the tip of the fiber and the waveguide is filled is expanded or constricted due to a change in environmental temperature so that some distortion occurs. However, since the sealer has a larger value of elastic modulus than that of the fiber-coupling agent, such distortion of the fiber-coupling agent can be restricted by the sealer. This allows relative movement between the tip of the fiber and the waveguide to be restricted and thus fluctuation of coupling loss can be reduced. Further, the sealer can be made of resin with low transparency, unlike the fiber-coupling agent. Further, it is advantageous that the sealer is made of resin with low moisture permeability.

In the above-mentioned optical element combination structure which is the embodiment according to the first aspect, preferably, the fiber adhesive and the fiber-coupling agent are the same adhesive. Further, in the above-mentioned optical element combination structure which is the embodiment according to the first aspect, preferably, the fiber adhesive and the fiber-coupling agent may be the same adhesives or different compounds. It is preferable that values of elastic modulus of the fiber adhesive and the fiber-coupling agent are within a range of 0.01-3.0 GPa and values of coefficient of linear expansion thereof are within a range of 40-300 ppm/° C., and a value of elastic modulus of the sealer is within a range of 5-20 GPa and a value of coefficient of linear expansion thereof is within a range of 5-30 ppm/° C. Further, values of viscosity of the fiber adhesive and the fiber-coupling agent are within a range of 100-8,000 mPa·s and a value of viscosity of the sealer is within a range of 10,000-200,000 mPa·s.

In the embodiment according to the first aspect of the present invention, preferably, the fiber adhesive is a compound different from the fiber-coupling agent and a value of elastic modulus of the fiber-coupling agent is smaller than that of elastic modulus of the fiber adhesive.

In this optical element combination structure, since the fiber adhesive and the fiber-coupling agent are different compounds, in comparison with a case where they are the same adhesive, relative movement between the tip of the fiber and the waveguide can be restricted. Specifically, when an environmental temperature is changed, the fiber adhesive and the fiber-coupling agent are expanded or constricted. If they are the same adhesive, the fiber adhesive and the fiber-coupling agent are expanded or constricted at the same ratio. On the contrary, when a value of elastic modulus of the fiber-coupling agent is smaller than that of elastic modulus of the fiber adhesive, with respect to the same change in an environmental temperature as above-stated, such ratio of expansion or constriction of the fiber-coupling agent can be reduced more than that of expansion or constriction of the fiber adhesive. Thus, even if relative movement between the fiber and the V-shaped cross-sectional groove occurs, relative movement between the fiber and the waveguide is restricted so that fluctuation of coupling loss of the combination structure can be reduced. Further, since the fiber adhesive is used only for securing the fiber to the V-shaped cross-sectional groove, a transparency feature and a refractive index adaptive feature thereof are unnecessary and thus an adhesive without such features can be selected. Further, it is advantageous that an adhesive with high moisture-resistant adhesiveness can be used.

In the above-mentioned optical element combination structure which is the embodiment according to the first aspect, preferably, the fiber-coupling agent is further applied over the tip of the optical fiber to seal the optical fiber and the optical waveguide.

In this optical element combination structure, in comparison with that in which only a space between the fiber and the waveguide is filled with the fiber-coupling agent, expansion and constriction of the fiber-coupling agent due to a change in environmental temperature can be restricted. Thus, relative movement between the fiber and the waveguide is restricted so that fluctuation of coupling loss of the combination structure can be much reduced.

In the above-mentioned optical element combination structure which is the embodiment according to the first aspect, preferably, a value of elastic modulus of the fiber-coupling agent is within a range of $10^{-6}$-$10^{-3}$ GPa and a value of coefficient of linear expansion thereof is within a range of 100-400 ppm/° C., and a value of elastic modulus of the fiber adhesive is within a range of 0.01-3.0 GPa and a value of coefficient of linear expansion thereof is within a range of 20-100 ppm/° C. Further, a value of viscosity of the fiber-coupling agent is within a range of 1,000-5,000 mPa·s and a value of viscosity of the fiber adhesive is within a range of 5,000-100,000 mPa·s.

Regarding an optical fiber structure disclosed in Patent Publication 4, in order to determine why a value of coupling loss at +25° C. is large when an adhesive 216 having relatively high viscosity is used, the inventor observed a cross section of the optical element combination structure (optical fiber structure) 100 with a metallographic microscope, in which structure the adhesive 216 having relatively high viscosity is used. As a result, the inventor recognized that the adhesive 216 remains in gaps between V-shaped cross-sectional grooves 208 of a substrate 210 and optical fibers 202, 204. The present invention is a result of the inventor's strong efforts to reduce such remaining adhesive in the gaps between the V-shaped cross-sectional grooves and the fibers.

To achieve the above-mentioned second object of the present invention, an optical fiber structure according to the second aspect of the present invention comprises at least one optical fiber extending longitudinally and having an end surface; a substrate having at least one V-shaped cross-sectional groove to receive and position the at least one optical fiber; a holding member for covering the optical fiber from its upper side and pushing it against the substrate; and an adhesive with which spaces between any two of the substrate, the optical fiber and the holding member are filled to fix them to each other; wherein the holding member has a first contact portion, an intermediate portion and a second contact portion, which portions are disposed in turn in the longitudinal direction from a fiber-end-surface side, wherein, when the optical fiber is pushed against the substrate with the holding member, the first and second contact portions of the holding member contact the optical fiber and push it onto the substrate while the intermediate portion is spaced from the optical fiber via the adhesive.

In this optical fiber structure, when the optical fiber is pushed against the substrate by the holding member, excess adhesive between the fiber and the V-shaped cross-sectional groove of the substrate is displaced and the adhesive flows out from gaps between the fiber and the groove. When a distance between the fiber and the groove decreases, fiber portions which the first and second contact portions of the holding member contact are forced to be pushed against the substrate. On the other hand, another fiber portion which is spaced from the intermediate portion of the holding member is not forced to be pushed against the substrate. Therefore, especially when a value of viscosity of the adhesive is relatively high, excess adhesive does not flow out from the fiber portions forced to be pushed against the substrate, namely, from the gaps between the fiber portions corresponding to the first and second contact portions and the groove; instead it flows out from the fiber portion spaced from the intermediate portion, namely from the fiber portion corresponding to the intermediate portion. Thus, the fiber portions corresponding to the first and second contact portions are enabled to move much closer to the groove of the substrate. Preferably, these fiber portions can be substantially contacted with the groove of the substrate. This means that the fiber is moved much closer to an intended position where coupling loss is the least. As a result, even when an adhesive having relatively high viscosity is used, coupling loss of the optical fiber structure can be decreased. Of course, the present invention includes within its scope an optical fiber structure in which an adhesive having relatively low viscosity is used.

On the other hand, in an optical fiber structure in the prior art, when a distance between an optical fiber and a V-shaped cross-sectional groove decreases by pushing the fiber against a substrate by a holding block, excess adhesive between the fiber and the groove does not tend to flow out from gaps between the fiber and the groove over the whole longitudinal length of the holding block. Especially when a value of viscosity of an adhesive is relatively high, the adhesive remains in the gaps between the fiber and the groove. Therefore, the fiber is positioned at a position different from an intended position so that coupling loss increases.

In the embodiment according to the second aspect of the present invention, preferably, a plurality of the optical fibers are disposed parallel to each other and a plurality of V-shaped cross-sectional grooves corresponding to the respective optical fibers are formed on the substrate.

In this optical fiber structure, excess adhesive flows from gaps between one fiber and one groove into a space between the fiber and another fiber and further flows through a space between the intermediate portion of the holding member and the fibers, namely, over the fibers laterally relative to a longitudinal direction. This allows the excess adhesive to flow so that fiber portions corresponding to the first and second contact portions of the holding member come much closer to the groove. As a result, regarding each of a plurality of optical fibers, coupling loss can be reduced.

The above-stated matters are useful especially for an optical fiber structure in which V-shaped cross-sectional grooves and cores of an optical waveguide, which are aligned with each other, are integrally formed. Further, pitches of adjacent fibers can be made more uniformly so that the above-stated matters are useful for an optical fiber structure having an optical fiber array.

On the other hand, in an optical fiber structure in the prior art, since the holding block longitudinally contacts an optical fiber along the whole length of the holding block, excess adhesive flowing into a space between one fiber and another fiber adjacent thereto cannot flow over the fibers. Therefore, the adhesive tends to remain in gaps between the fiber and the groove.

In the embodiment according to the second aspect of the present invention, preferably, the first contact portion of the holding member has a contact surface contacting the optical fiber to push it against the substrate, and opposing surfaces formed on the opposed sides relative to the optical fiber and facing the substrate, wherein the contact surface is defined as a recess relative to the opposing surfaces, and wherein distances between the opposing surfaces on the opposed sides relative to the recess and the substrate are within a range of 20-40 µm.

In this optical fiber structure, the holding member can be firmly secured to the substrate and thus fluctuation of coupling loss due to a change in a temperature of the fiber structure can be reduced. Specifically, when distances between the opposing surfaces and the substrate are too large, adhesive force between the holding member and the substrate is reduced while, when distances therebetween are too small, stress imposed on the fiber by the adhesive due to a change in a temperature and thus coupling loss of the fiber structure become worse.

Further, since the opposing surfaces are provided on the opposed sides of the contact surface laterally relative to the longitudinal direction, the holding member and the substrate are arranged substantially symmetrical to the fiber. Thus, when a temperature is changed, stress imposed on the fiber by the adhesive is counterbalanced so that deterioration of coupling loss of the fiber structure can be prevented.

In the embodiment according to the second aspect of the present invention, a value of viscosity of the adhesive is within a range of 10,000-50,000 mPa·s. Further, it is preferable that a value of elastic modulus of the adhesive is within a range of 0.01-3.0 GPa and a value of coefficient of linear expansion thereof is within a range of 20-100 ppm/° C.

In this optical fiber structure, fluctuation of coupling loss due to a change in temperature becomes relatively small. Therefore, for example, while a temperature is changed from −40° C. to +85° C., a value of coupling loss can be equal to or less than a predetermined level and thus the third object of the present invention can be achieved. Such a predetermined level is preferably 0.5 dB and more preferably 0.4 dB.

In the embodiment according to the second aspect of the present invention, preferably, a longitudinal length of the first contact portion is 0.5-3 times a diameter of the optical fiber.

In this optical fiber structure, due to the first contact portion of the holding member, it can be ensured that the fiber comes close to the groove of the substrate and thus coupling loss of the fiber can be decreased. Specifically, when a longitudinal length of the first contact portion is too short, a force for pushing the fiber against the substrate tends to be too weak while, when the longitudinal length of the first contact portion is too long, the fiber structure becomes similar to a fiber structure in the prior art.

In the embodiment according to the second aspect of the present invention, the substrate has an upper surface provided with the V-shaped cross-sectional groove, and the intermediate portion has a flat lower surface opposed to the upper surface of the substrate and extending across the optical fiber.

In this optical fiber structure, by using a relatively easy process, coupling loss of the fiber structure can be decreased.

To achieve the second object of the present invention, an optical fiber structure according to the present invention comprises at least one optical fiber extending longitudinally and having an end surface; a substrate having at least one V-shaped cross-sectional groove to receive and position the at least one optical fiber; a holding member for covering the optical fiber from its upper side and pushing it against the substrate; and an adhesive with which spaces between any two of the substrate, the optical fiber and the holding member are filled to fix them to each other; wherein the substrate has a first grooved portion, an intermediate portion and a second grooved portion, which portions are disposed in turn in the longitudinal direction from a fiber-end-surface side, and wherein the V-shaped cross-sectional groove is formed on the first and second grooved portions and the intermediate portion is spaced from the optical fiber via the adhesive.

In this optical fiber structure according to the present invention, when the optical fiber is pushed against the substrate by the holding member, excess adhesive between the fiber and the V-shaped cross-sectional groove of the substrate is displaced and the adhesive flows out from gaps between the fiber and the groove. When a distance between the fiber and the groove decreases, fiber portions to be received in the first and second grooved portions of the substrate are forced to be pushed against the substrate. On the other hand, another fiber portion spaced from the intermediate portion of the substrate is not forced to be pushed against the substrate. Therefore, especially when a value of viscosity of the adhesive is relatively high, excess adhesive does not flow out from the fiber portions forced to be pushed against the substrate, namely, from the gaps between the fiber portions corresponding to the first and second grooved portions and the groove; instead it flows out from the fiber portion spaced from the intermediate portion, namely from a space between the intermediate portion and the fiber portion corresponding thereto. Thus, the fiber portions corresponding to the first and second grooved portions are enabled to be moved much closer to the groove of the substrate. Preferably, these fiber portions can be substantially contacted with the groove of the substrate. This means that the fiber is moved to a position much closer to an intended position where coupling loss is the least. As a result, even when an adhesive having relatively high viscosity is used, coupling loss of the optical fiber structure can be decreased. Of course, the present invention includes within its scope an optical fiber structure in which an adhesive having relatively low viscosity is used.

In the embodiment according to the second aspect of the present invention, the optical fiber structure may be an optical fiber array; an optical element combination structure (an optical module) in which the V-shaped cross-sectional groove and an optical waveguide are integrally coupled to each other and an optical fiber disposed onto the V-shaped cross-sectional groove and the optical waveguide are combined with each other; or an optical element combination structure (an optical module) in which the optical fiber array and the optical waveguide are coupled to each other.

By the optical element combination structure according to the present invention in which an optical fiber and an optical waveguide are combined with each other, fluctuation of coupling loss of light due to a change in environmental structure can be reduced.

As explained above, by an optical fiber structure according to the present invention, when an adhesive having relatively high viscosity is used, coupling loss can be decreased.

Further, the optical fiber structure according to the present invention enables coupling loss to be equal to or less than a predetermined level when a temperature is changed from −40° C. to +85° C.

DETAILED DESCRIPTION OF THE PREFERRED EMBODIMENTS

Figure 1:
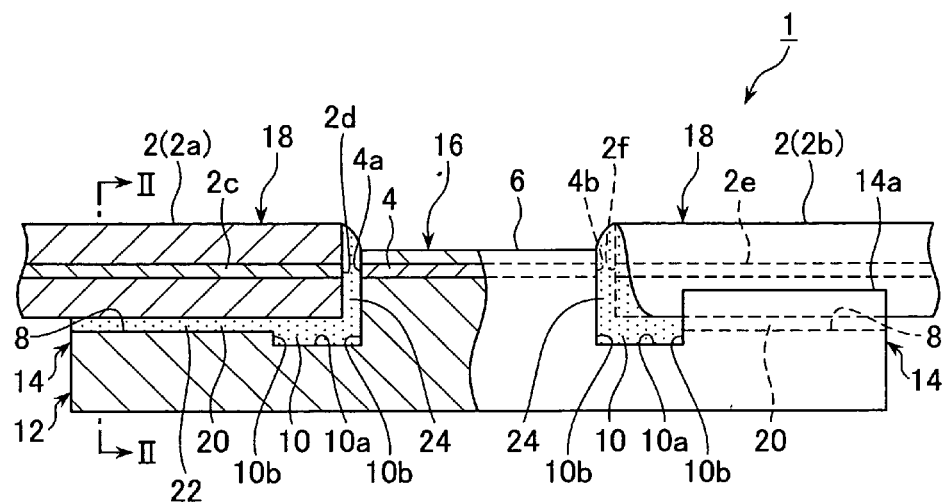
FIG. 1 is a partially cross-sectional front view of an optical element combination structure which is a first embodiment of a first aspect of the present invention.

Referring to the drawings, four embodiments of an optical element combination structure according to the first aspect of the present invention will be explained in detail below. Firstly, referring to FIGS. 1 and 2, a first embodiment according to the first aspect of the present invention will be explained. FIG. 1 is a partially cross-sectional front view of an optical element combination structure having optical fibers and an optical waveguide, which combination structure is a first embodiment according to the first aspect of the present invention and FIG. 2 is a cross-sectional view taken along the line II-II in FIG. 1.

Figure 2:
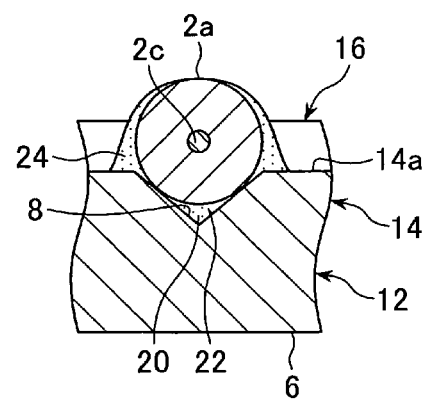
FIG. 2 is a cross-sectional view taken along the line II-II in FIG. 1.

As shown in FIGS. 1 and 2, an optical element combination structure 1 in which optical fibers and an optical waveguide are combined with each other has optical fibers 2, an optical waveguide 4 to be aligned with the fibers 2, and a substrate 6 formed with the waveguide 4. The fibers 2 include an input optical fiber 2a and an output optical fiber 2b. In order that light passed through the input fiber 2a is transmitted through the waveguide 4 to the output fiber 2b, an end surface 2d of a core 2c of the input fiber 2a and an input end surface 4a of the waveguide 4 are aligned with each other and an output surface 4b of the waveguide 4 and an end surface 2f of a core 2e of the output fiber 2b are aligned with each other. The respective numbers of the input fibers 2a and the output fibers 2b can be one or more and, in the latter case, the fibers could be arranged laterally, namely, in an array form. For example, when the number of the input fibers 2a is one and the output fibers 2b are arranged in an array form, the combination structure 1 functions as an optical splitter, and when the input fibers 2a are arranged in an array form and the number of the output fibers is one, the combination structure 1 functions as an optical coupler. Since an input-side structure of the combination structure 1 is similar to an output-side structure thereof, only the former will be explained below and thus explanations of the latter will be omitted.

The substrate 6 has a V-shaped cross-sectional groove 8 having a V-shaped cross section, opened upward, and formed so that, when a fiber 2 is disposed onto the groove 8, the fiber 2 and the waveguide 4 are aligned with each other, and a recess 10 extending downward beyond the groove 8 and defining a space opened upward and formed on a waveguide-side with respect to the V-shaped cross sectional groove 8. Specifically, the substrate 6 has a base portion 12, a fiber support portion 14 extending upward from the base portion 12 and supporting the fiber 2, and a waveguide portion 16 which extends upward apart from the fiber support portion 14 and on which the waveguide 4 is formed so that the recess 10 is formed between the fiber support portion 14 and the waveguide portion 16. The V-shaped cross-sectional groove 8 and the waveguide 4 are formed so that, when the fiber 2 having a known outer diameter (for example, 125 µm) is disposed onto the V-shaped cross-sectional groove 8, the fiber 2 and the waveguide 4 are in alignment with each other. A bottom surface 10a of the recess 10 is formed substantially parallel to an upper surface 14a of the fiber support portion 14 and two side surfaces 10b are formed substantially perpendicular to the bottom surface 10a. A length of the recess 10 in a longitudinal direction relative to the fiber is, for example, 100-150 µm.

The fiber 2 is disposed on the V-shaped cross-sectional groove 8 and a tip 18 of the fiber 2 protrudes into the recess 10 so that the fiber 2 and the waveguide 4 are aligned with each other. The end surface 2d of the fiber 2 preferably is abutted to the input end surface 4a of the waveguide 4, but a gap of about 10-20 µm is actually provided between the end surface 2d of the fiber 2 and the input end surface 4a of the waveguide 4 for facilitating automatic assembly of the fiber 2 and the waveguide 4. The fiber 2 is secured on the V-shaped cross-sectional groove 8 with a fiber adhesive with which a space between the fiber 2 and the V-shaped cross-sectional groove 8 is filled.

Further, the tip 18 of the fiber 2 and the waveguide 4 are coupled to each other with a fiber-coupling agent 24 with which a space between the tip 28 of the fiber and the waveguide 4 and the recess 10 are filled. As light transmitted from the fiber 2 passes through the fiber-coupling agent 24 to the waveguide 4, it is necessary for the fiber-coupling agent 24 to be transparent with respect to the light and have an appropriate refractive index or a refractive index adaptive feature. Preferably, the fiber-coupling agent 24 is an agent being used as a refractive index adaptive agent. The fiber-coupling agent 24 may be a light curing type adhesive such as an ultraviolet curing type resin and a visible light curing type adhesive, a light and thermal curing type adhesive formed by adding a thermal curing catalytic agent to such a light curing type adhesive, a gel compound, or a filler. Such a light curing type adhesive is, for example, an ultraviolet curing type epoxy resin "UV2100" manufactured by Daikin Industries Ltd. Such a light and thermal curing type adhesive is, for example, an ultraviolet curing type epoxy resin and an ultraviolet curing type acrylic resin, such as an ultraviolet curing type epoxy resin "3553HM" manufactured by EMI Corporation.

The fiber adhesive 22 is preferably a compound similar to the fiber-coupling agent 24. Further, the fiber adhesive 22 and the fiber-coupling agent 24 are preferably the same, but they may be compounds different from each other. In FIG. 1, the fiber adhesive 22 and the fiber-coupling agent 24 are the same adhesive.

An example of a way of manufacturing an optical element combination structure 1 having an optical fiber and an optical waveguide, which is the first embodiment according to the first aspect of the present invention, is as follows. A substrate 6 made of a material such as silicon and a polymer material is prepared and, by anisotropic etching the substrate 6 according to a resist pattern formed by means of photolithography, the substrate 6 is formed with grooves 8 each having a V-shaped cross section. Then, the substrate 6 having the V-shaped cross-sectional grooves 8 is formed with an optical waveguide 4. Particularly, in a case where the waveguide 4 is made of a polymer material, after a clad layer and a core layer on the clad layer are formed by spin coating or molding, a waveguide core having a rectangular cross section is formed from the core layer by means of a process such as photolithography and reactive ion etching or by means of a machining process such as crimping. Then, a further clad layer is formed in a manner similar to the forming way mentioned above to cover the waveguide core so that the waveguide 4 is formed. Also, in a case where a waveguide 4 is made of quartz, after a quartz layer is formed on the substrate 6 by means of a process such as flame hydrate deposition and CVD, a quartz core having a rectangular cross section is formed by means of a process such as dry etching and then clad layer is formed to cover the quartz core so that he waveguide 4 is formed. The steps of forming V-shaped cross-sectional grooves 8 and forming waveguide 4 are performed so that a positional relationship between the V-shaped cross-sectional grooves 8 and the waveguide 4 is obtained, namely, when the fiber 2 is placed on the V-shaped cross-sectional groove 8, the fiber 2 and the waveguide 4 are aligned with each other. Then, the recess 10 is formed so that the end surface 2 of the fiber 2a placed on the V-shaped cross-sectional groove 8 can abut the input end surface 4a of the waveguide 4. Then, the fiber adhesive 22 is applied to the V-shaped cross-sectional groove 8. The fiber 2 is placed on the V-shaped cross-sectional groove 8 so that the tip 18 of the fiber 2 protrudes into the recess 10 and the fiber 2 is adhered to the waveguide 4. Then, the fiber-coupling agent 24 is filled between the end surface 2d of the fiber 2a and the input end surface 4a of the waveguide 4 and in the recess 10 so that the fiber 2 is coupled to the waveguide 4.

Figure 3:
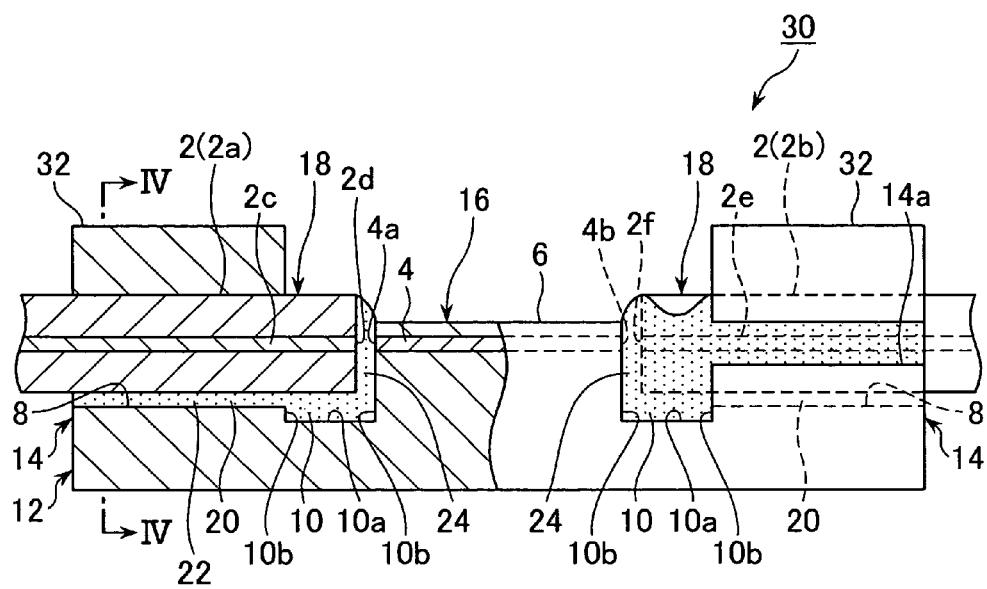
FIG. 3 is a partially cross-sectional front view of an optical element combination structure which is a second embodiment of the first aspect of the present invention.

Next, referring to FIGS. 3 and 4, a second embodiment of the optical element combination structure according to the first aspect of the present invention will be explained. FIG. 3 is a partially fragmental front view of an optical element combination structure of the second embodiment of the first aspect of the present invention and FIG. 4 is a cross-sectional view along the line IV-IV in FIG. 3.

An optical element combination structure having an optical fiber and an optical waveguide, which combination structure is a second embodiment according to the first aspect of the present invention, is similar to the above-mentioned optical element combination structure of the first embodiment according to the first aspect of the present invention, except for adding a holding member explained below. Thus, the same reference numbers as those of the first embodiment are attached to portions of the second embodiment corresponding to those of the first embodiment and explanations of such portions of the second embodiment are omitted. Now, portions of the second embodiment different from those of the first embodiment will be explained.

Figure 4:
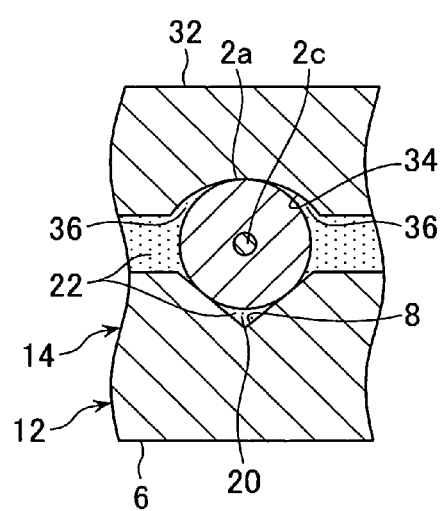
FIG. 4 is a cross-sectional view taken along the line IV-IV in FIG. 3.

As shown in FIGS. 3 and 4, an optical element combination structure 30 which is a second embodiment of the first aspect of the present invention has a holding member 32 disposed so that the fiber 2 is sandwiched between the holding member 32 and an upper surface 14a of the fiber support portion 14 and the holding member 32 is spaced from the upper surface 14a. Preferably, the holding member 32 is made of a glass or a polymer material. The holding member 32 has a wide groove 34 which is disposed over the fiber 2 and is wider than the outer diameter thereof. A cross-sectional shape of the wide groove 34 may be rectangular, U-shaped or otherwise. A space 36 filled with the fiber adhesive 22 is formed between the wide groove 34 and the fiber 2 on the opposite sides relative to the fiber 2. The fiber adhesive 22 is filled between the wide groove 34 and the fiber 2 and between the holding member 32 and the upper surface 14a of the fiber support portion 14.

The fiber adhesive 22 and the fiber-coupling agent 24 are similar to those of the first embodiment of the present invention. Preferably, the fiber adhesive 22 and the fiber-coupling agent 24 are the same, but they may be different from each other. Similar to FIG. 1, FIG. 3 shows a condition in which the fiber adhesive 22 and the fiber-coupling agent 24 are the same adhesive.

Further, by appropriately selecting values of elastic modulus, coefficient of linear expansion and glass transition point of the fiber adhesive 22 and the fiber-coupling agent 24, an amount of relative shift between the fiber 2 and the waveguide 4 derived from a change in an environmental temperature, namely, a value of fluctuation of insertion loss or coupling loss of a light transmitted to the waveguide 4 can be made smaller. Preferably, values of elastic modulus of the fiber adhesive 22 and the fiber-coupling agent 24 are 0.01-0.5 GPa, values of coefficient of linear expansion thereof are 20-300 ppm/° C. and values of glass transition point thereof are equal to or more than 100° C. and temperatures which are higher than an environmental temperature by 15° C. Further, values of viscosity of the fiber adhesive 22 and the fiber-coupling agent 24 are preferably 100-1,000 Pa·s, more preferably 100-500 Pa·s. The fiber adhesive 22 and the fiber-coupling agent 24 are, for example, an ultraviolet curing type acrylic resin "AT8224" manufactured by NTT-AT Corporation.

In an example of a method of manufacturing the combination structure 30 of the second embodiment according to the first aspect of the present invention, in addition to the method of manufacturing the combination structure 1 of the first embodiment according thereto, steps of applying an appropriate amount of the fiber adhesive 22 over the fiber 2 and disposing the wide groove 36 of the holding member 32 on the fiber 2 can be performed.

Figure 5:
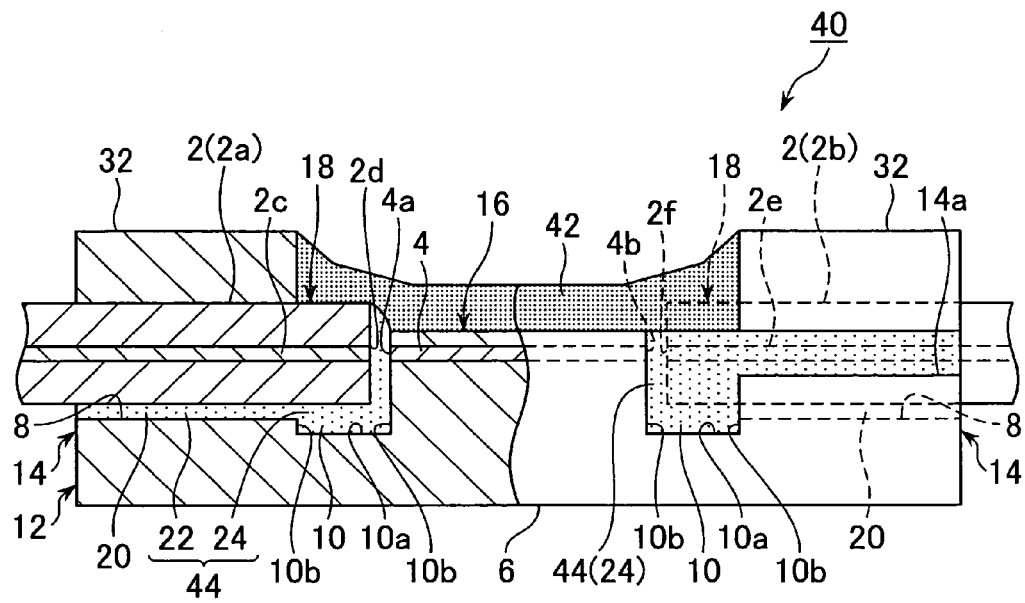
FIG. 5 is a partially cross-sectional front view of an optical element combination structure which is a third embodiment of the first aspect of the present invention.

Next, referring to FIG. 5, a third embodiment of the optical element combination structure according to the first aspect of the present invention will be explained. FIG. 5 is a partially fragmental front view of an optical element combination structure of the third embodiment of the first aspect of the present invention.

An optical element combination structure which has an optical fiber and an optical waveguide and is a third embodiment according to the first aspect of the present invention is similar to the above-mentioned optical element combination structure of the second embodiment according to the first aspect of the present invention, except for adding a sealer explained below. Thus, the same reference numbers as those of the second embodiment are attached to portions of the third embodiment corresponding to those of the second embodiment and explanations of such portions of the third embodiment are omitted. Now, portions of the third embodiment different from those of the second embodiments will be explained. Please note that a cross-sectional view of the combination structure, which is the third embodiment of the first aspect of the present invention, is omitted because it is similar to that of the combination structure which is the second embodiment of the first aspect of the present invention shown in FIG. 4.

As shown in FIG. 5, an optical element combination structure 40 which is a third embodiment of the first aspect of the present invention has a sealer 42 applied thereto so that it covers a tip portion 18 of the fiber 2 and fiber-coupling agent 24. Further, the sealer 42 is coupled to the holding member 32, extends over the waveguide portion 16 of the substrate 6, and is connected to a sealer applied on the output side.

The fiber adhesive 22 and the fiber-coupling agent 24 in the third embodiment according to the first aspect of the present invention are similar to those of the first embodiment according thereto. The fiber adhesive 22 and the fiber-coupling agent 24 may be the same or different from each other, and now an example in which both the fiber adhesive 22 and the coupling agent 24 are the same will be explained. FIG. 5 shows a condition in which the fiber adhesive 22 and the fiber-coupling agent 24 are the same adhesive 44. The adhesive 44 is, for example, an ultraviolet curing type epoxy resin "3553HM" manufactured by EMI Corporation.

The sealer 42 is a compound different from the adhesive 44. Further, the values of elastic modulus of the fiber adhesive 22 and the fiber-coupling agent 24 are preferably smaller than those of the sealer 42. The sealer 42, which is different from the fiber-coupling agent 24, can be an opaque agent. Further, the sealer 42 may be an epoxy resin or a solventless liquid sealer, for example, "CEL-C-1900" manufactured by Hitachi Chemical Industry Co., Ltd. When an epoxy resin is used, it is preferable that it has small moisture permeability in order to ensure a long life thereof in a high moisture environment.

Further, by appropriately selecting values of elastic modulus, coefficient of linear expansion and glass transition point Tg of the above-mentioned adhesive 44 and the sealer 42, an amount of relative shift between the fiber 2 and the waveguide 4 derived from a change in an environmental temperature; namely, fluctuation of coupling loss of light transmitted to the waveguide 4, can be made smaller. Preferably, values of elastic modulus of the fiber adhesive 22 and the fiber-coupling agent 24 are 0.01-3.0 GPa, values of coefficient of linear expansion thereof are 40-300 ppm/° C. and values of glass transition point Tg thereof is a temperature which is equal to or more than 100° C. and is higher than an environmental temperature by 15° C. Values of viscosity of the fiber adhesive 22 and the fiber-coupling agent 24 are preferably 100-8,000 Pa·s, more preferably 100-2,000 Pa·s. Further, a value of elastic modulus of the sealer 42 is 5-20 GPa, a value of coefficient of linear expansion thereof is 5-30 ppm/° C. and a value of glass transition point Tg thereof is a temperature which is equal to or more than 100° C. and is higher than an environmental temperature by 15° C. A value of viscosity of the sealer 42 is preferably 10,000-200,000 Pa·s, more preferably 10,000-100,000 Pa·s. In this case, the adhesive 44 is, for example, an ultraviolet curing type epoxy resin "UV2100" manufactured by Daikin Industries and the sealer is, for example, a solventless liquid sealer "CEL-C-1900" manufactured by Hitachi Chemical Industry Co., Ltd.

In an example of a method of manufacturing the combination structure 40 of the third embodiment according to the first aspect of the present invention, in addition to the method of manufacturing the combination structure of the second embodiment according thereto, a step of applying the sealer 42 over the tip portion 18 of the fiber 2 and the fiber-coupling agent 24 can be performed.

Figure 6:
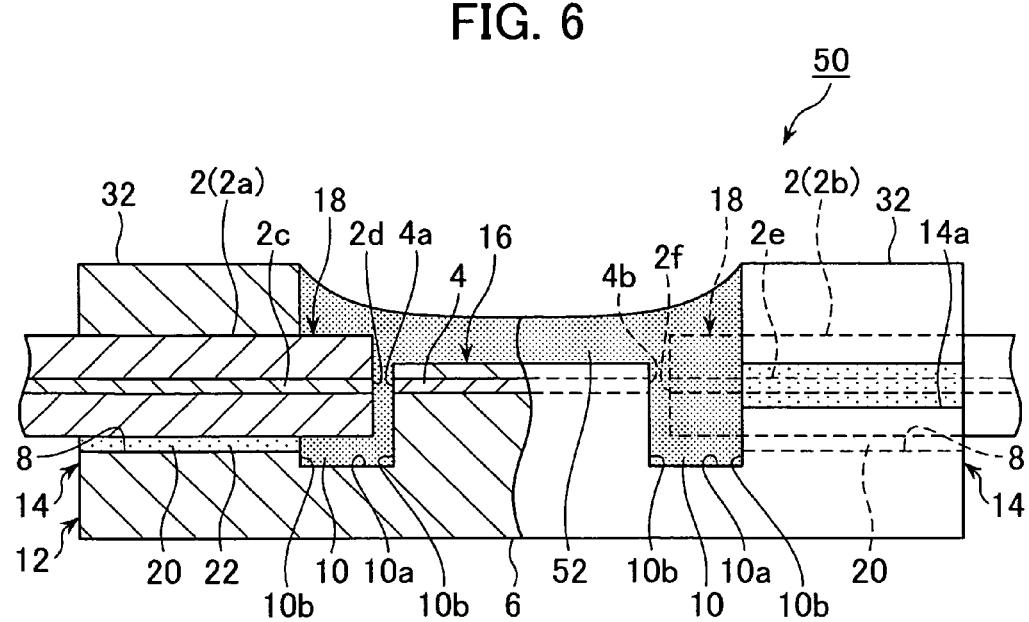
FIG. 6 is a partially cross-sectional front view of an optical element combination structure which is a fourth embodiment of the first aspect of the present invention.

Next, referring to FIG. 6, a fourth embodiment of the optical element combination structure according to the first aspect of the present invention will be explained. FIG. 6 is a partially fragmental front view of an optical element combination structure of the fourth embodiment of the first aspect of the present invention.

An optical element combination structure 50 which has an optical fiber and an optical waveguide and is a fourth embodiment according to the first aspect of the present invention is similar to the above-mentioned optical element combination structure 30 of the second embodiment according to the first aspect of the present invention, except that an arrangement of the fiber adhesive and the fiber-coupling agent is different and a range for applying the fiber-coupling agent is different. Thus, the same reference numbers as those of the second embodiment are attached to portions of the fourth embodiment corresponding to those of the second embodiment and explanations of such portions of the fourth embodiment are omitted. Now, portions of the fourth embodiment different from those of the second embodiment will be explained. Please note that a cross-sectional view of the combination structure which is the fourth embodiment of the first aspect of the present invention is omitted because it is similar to that of the combination structure which is the second embodiment of the first aspect of the present invention shown in FIG. 4.

In this embodiment, a fiber-coupling agent 52 and the fiber adhesive 22 are compounds different from each other. Further, elastic modulus of the fiber-coupling agent 52 is preferably smaller than that of the fiber adhesive 22.

Also, the fiber-coupling agent 52 is applied not only to a region filled with the fiber-coupling agent 24 of the second embodiment according to the first aspect, but also so that the fiber-coupling agent 52 covers the tip portion of the fiber to seal the fiber and the waveguide. The fiber-coupling agent 52 is coupled to the holding member 32, extends over the waveguide portion 16 of the substrate 6, and is connected to a fiber-coupling agent applied on the output side. However, the fiber-coupling agent 52 may fill only regions between the tip portion 18 of the fiber 2 and the waveguide 4 and the recess 10, similar to the fiber-coupling agent 24 of the second embodiment according to the first aspect.

The fiber adhesive 22 may be a compound similar to that of the first embodiment of the first aspect or an adhesive without a light transmission feature or without a refractive index adaptive feature. The fiber adhesive 22 may also have a moisture-resistant adhesive feature. The fiber adhesive 22 is, for example, an ultraviolet curing type epoxy resin "3553HM" manufactured by EMI Corporation and ultraviolet curing type epoxy resins "WR8774" and "WR8775" manufactured by Kyoritsu Chemical & Co., Ltd. The fiber-coupling agent 52 may be an adhesive, a gel compound, or a filler. The fiber-coupling agent 52 is, for example, a cation curing type silicone resin "WR8962H" manufactured by Kyolitsu Chemical & Co., Ltd.

Further, by appropriately selecting values of elastic modulus, coefficient of linear expansion and glass transition point Tg of the above-mentioned fiber-coupling agent 52 and the fiber adhesive 22, an amount of relative shift between the fiber 2 and the waveguide 4 derived from a change in an environmental temperature, namely, fluctuation of coupling loss of light transmitted to the waveguide 4, can be made smaller. Preferably, a value of elastic modulus of the fiber-coupling agent 52 is $10^{-6}$-$10^{-3}$ GPa, a value of coefficient of linear expansion thereof is 100-400 ppm/° C. and any value of glass transition point Tg is allowed. A value of viscosity of the fiber-coupling agent 52 is preferably 1,000-5,000 Pa·s, more preferably 2,000-3,000 Pa·s. Further, a value of elastic modulus of the fiber adhesive 22 is 0.01-3.0 GPa, a value of coefficient of linear expansion thereof is 20-100 ppm/° C. and a value of glass transition point Tg thereof is a temperature which is equal to or more than 100° C. and is higher than an environmental temperature by 15° C. A value of viscosity of the fiber adhesive 22 is preferably 5,000-100,000 Pa·s, and more preferably 5,000-50,000 Pa·s. In this case, the fiber adhesive 22 is, for example, an ultraviolet curing type epoxy resin "WR8774" manufactured by Kyoritsu Chemical & Co., Ltd. and the fiber-coupling agent 52 is, for example, a cation curing type silicone resin "WR8962H" manufactured by Kyoritsu Chemical & Co., Ltd.

In an example of a method of manufacturing the combination structure of the fourth embodiment according to the first aspect of the present invention, in addition to the method of manufacturing the combination structure of the second embodiment according thereto, a step of applying a fiber-coupling agent over the tip portion of the fiber to seal the fiber and the waveguide can be performed.

EXAMPLES

Now, experimental examples relating to each of the above-mentioned embodiments according to the first aspect of the present invention will be explained. Conditions common to each of the examples were as follows. A fiber having an outer diameter of 125 μm was used. A substrate 6 which was a single crystal and was easily anisotropic etched was used. As a material for holding member 32, pylex (registered trademark) was used, which was transparent to enable a fiber adhesive 22 to be ultraviolet cured and had the same value of coefficient of linear expansion (3.2 ppm/° C.) as that of the substrate 6.

In an Experiment 1 of the first embodiment of the first aspect, as a fiber adhesive 22 and a fiber-coupling agent 24, an ultraviolet curing type epoxy resin was used, in which the value of elastic modulus thereof was 2.4 GPa, the value of coefficient of linear expansion thereof was 107 ppm/° C., the value of viscosity thereof was 250 mPa·s, and the value of glass transition point Tg was 129° C. and which had a main component of fluorinated epoxy compound represented by Formula 1 in which Rf was represented by Formula 2, the epoxy resin being, for example, "UV2100" manufactured by Daikin Industries Ltd.

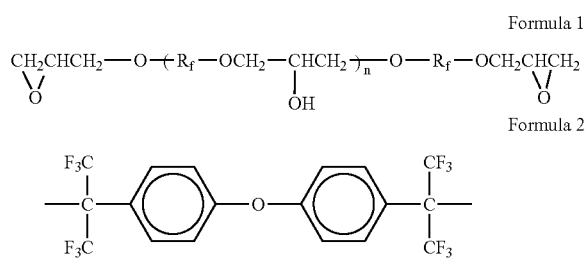

Formula 1

Formula 2

A fluorinated epoxy compound described in Table 1 on page 90 of "Development and Application Technology of Optoelectronics Material" issued by Technical Information Society Co, Ltd. on Feb. 9, 2001 should be referred to. When an environmental temperature was changed by 65° C., an amount of relative shift between the fiber 2 and the waveguide 4 was 0.8 μm and a value of fluctuation of coupling loss of light toward the waveguide 4 was 0.8 dB.

In an Experiment 2A of the second embodiment of the first aspect, as a fiber adhesive 22 and a fiber-coupling agent 24, similarly to the Experiment 1, an ultraviolet curing type epoxy resin was used, in which the value of elastic modulus thereof was 2.4 GPa, the value of coefficient of linear expansion thereof was 107 ppm/° C., the value of viscosity thereof was 250 mPa·s, and the value of glass transition point Tg was 129° C. and which had a main component of fluorinated epoxy compound represented by Formula 1 in which Rf was represented by Formula 2, the epoxy resin being, for example, "UV2100". When an environmental temperature was changed by 65° C., an amount of relative shift between the fiber 2 and the waveguide 4 was 0.4 μm and a value of fluctuation of coupling loss of light toward the waveguide 4 was 0.4 dB.

In an Experiment 2B of the second embodiment of the first aspect, as a fiber adhesive 22 and a fiber-coupling agent 24, an ultraviolet curing type acrylic resin was used, in which the value of elastic modulus thereof was 0.05 GPa, the value of coefficient of linear expansion thereof was 200 ppm/° C., the value of viscosity thereof was 180 mPa·s, and the value of glass transition point Tg was 111° C. and which had a main component of fluorinated epoxy acrylate compound represented by Formula 3, the acrylic resin being, for example, "AT8224" manufactured by NTT-AT Corporation.

Further, in the above-mentioned Experiment 4 of the fourth embodiment according to the first aspect, as a fiber adhesive 22, instead of the above-mentioned ultraviolet curing type epoxy resin, another ultraviolet curing type epoxy resin was used, in which the value of elastic modulus thereof was 2.5 GPa, the value of coefficient of linear expansion thereof was 88 ppm/° C., the value of viscosity thereof was 7,000 mPa·s, and the value of glass transition point Tg was 145° C., the Formula 3

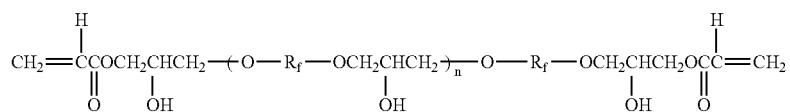

A fluorinated epoxy acrylate compound described in Table 2 on page 91 of "Development and Application Technology of Optoelectronics Material" issued by Technical Information Society Co, Ltd. on Feb. 9, 2001 should be referred to. When an environmental temperature was changed by 65° C., an amount of relative shift between the fiber 2 and the waveguide 4 was 0.2 μm and a value of fluctuation of coupling loss of light toward the waveguide 4 was 0.2 dB.

In an Experiment 3 of the third embodiment of the first aspect, as a fiber adhesive 22 and a fiber-coupling agent 24, similarly to the Experiments 1 and 2A, an ultraviolet curing type epoxy resin was used, in which the value of elastic modulus thereof was 2.4 GPa, the value of coefficient of linear expansion thereof was 107 ppm/° C., the value of viscosity thereof was 250 mPa·s, and the value of glass transition point Tg was 129° C. and which had a main component of fluorinated epoxy compound represented by Formula 1 in which Rf was represented by Formula 2, the epoxy resin being, for example, "UV2100". As a sealer 42, a solventless liquid sealer was used, in which the value of elastic modulus thereof was 15.3 GPa, the value of coefficient of linear expansion thereof was 13.4 ppm/° C., and the value of glass transition point Tg was 210° C., the sealer being, for example, "CEL-C-1900" manufactured by Hitachi Chemical Industry Co., Ltd. When an environmental temperature was changed by 65° C., an amount of relative shift between the fiber 2 and the waveguide 4 was 0.25 μm and a value of fluctuation of coupling loss of light toward the waveguide 4 was 0.2 dB.

In an Experiment 4 of the fourth embodiment of the first aspect, as a fiber adhesive 22, an ultraviolet curing type epoxy resin was used, in which the value of elastic modulus thereof was 2.5 GPa, the value of coefficient of linear expansion thereof was 62 ppm/° C., the value of viscosity thereof was 30,000 mPa·s, and the value of glass transition point Tg was 158° C., the epoxy resin being, for example, "WR8774" manufactured by Kyoritsu Chemical & Co., Ltd. As a fiber-coupling agent 52, a cation curing type silicone resin was used, in which the value of elastic modulus thereof was $5 \times 10^{-6}$ GPa, the value of coefficient of linear expansion thereof was 300 ppm/° C., the value of viscosity thereof was 2,800 mPa·s, and the value of glass transition point Tg was -123° C., the fiber-coupling agent being, for example, "WR8962H" manufactured by Kyoritsu Chemical & Co., Ltd. A cation curing type silicone resin described in Japanese Patent Laid-open Publication No. 2004-196977 should be referred to. When an environmental temperature was changed by 65° C., an amount of relative shift between the fiber 2 and the waveguide 4 was 0.1 μm and a value of fluctuation of coupling loss of light toward the waveguide 4 was 0.2 dB.

epoxy resin being, for example, "WR8775" manufactured by Kyoritsu Chemical & Co., Ltd. When an environmental temperature was changed by 65° C., an amount of relative shift between the fiber 2 and the waveguide 4 was 0.1 μm and a value of fluctuation of coupling loss of light toward the waveguide 4 was 0.2 dB.

In the above-mentioned ultraviolet curing type epoxy resin "3553HM" which was not used in the Experiments, the value of elastic modulus thereof is 1.0 GPa, the value of coefficient of linear expansion thereof is 55 ppm/° C., the value of viscosity thereof is 1,000 mPa·s, and the value of glass transition point Tg is 120° C.

How to measure values of elastic modulus, coefficient of linear expansion and glass-transition temperature of the above-mentioned adhesive and the above-mentioned sealer will be explained as follows.

A value of elastic modulus of a sealer and an adhesive was measured in accordance with JIS (Japanese Standards Association) —K7127, namely, "a tension test of plastic film and sheet".

A value of coefficient of linear expansion was measured by using the TMA (thermal machine analysis) method. The measurement condition was pull mode of 5° C. per minute. A temperature was changed from 20° C. to 100° C. When the temperature was 25° C., a value of coefficient of linear expansion was measured and such values are described in this specification.

A value of glass transition point was measured by using the DMA (Dynamic Mechanical Analysis) method. Concretely, a device for measuring dynamic viscoelastic modulus "ARES" which was for melt viscoelastic measurement and was manufactured by Rheometric Scientific Co,. Ltd. was used. While a sample was oscillated in a tension mode, a temperature was changed from 20° C. to 300° C. at a temperature raising speed of 5° C. per minute. A value of glass transition point calculated by the device was employed.

A value of viscosity was measured in accordance with a viscosity measuring method using a conical-plane type rotational viscometer in JIS (Japanese Standards Association) —Z8803, namely, "a viscosity measuring method". Concretely, an E-type viscometer (Model VPU-3B) manufactured by Tokyo Keiki Co. Ltd. was used, and values of viscosity are described in this specification in a condition of 25° C.

Now, referring to the drawings, three embodiments of an optical fiber structure according to a second aspect of the present invention will be explained in detail.

Figure 9:
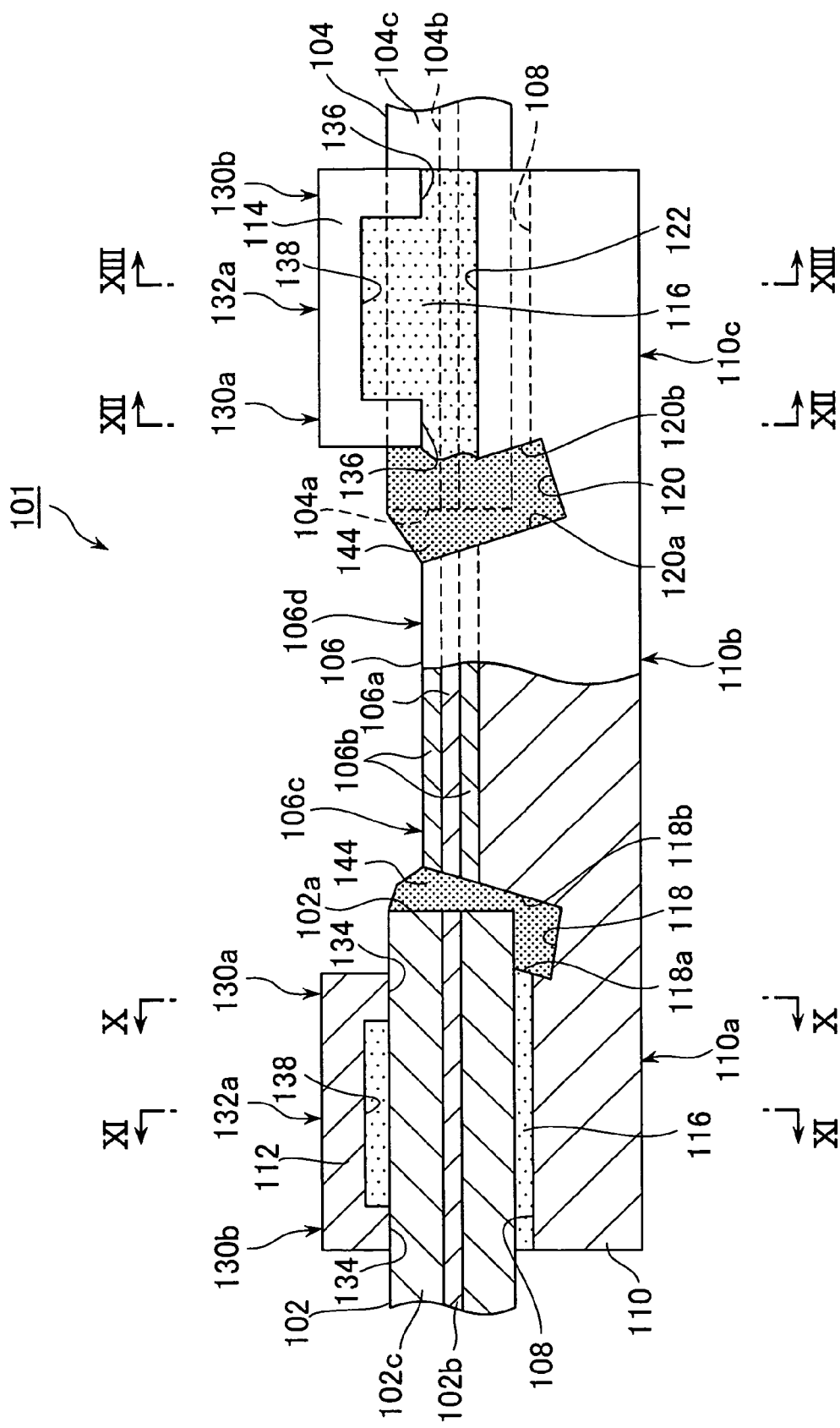
FIG. 9 is a partially cross-sectional front view of an optical element combination structure which is a first embodiment of a second aspect of the present invention.

First, referring to FIGS. 9-13, a first embodiment of the optical fiber structure according to the second aspect of the present invention will be explained. FIG. 9 is a partially cross-sectional front view of an optical element combination structure which is a first embodiment according to the second aspect of the present invention and in which V-shaped cross-sectional grooves and. an optical waveguide are integrally combined. FIGS.10-13 are respective cross-sectional views along lines X-X, XI-XI, XII-XII and XIII-XIII shown in FIG. 1.

As shown FIG. 9-13, an optical element combination structure 101, which is a first embodiment according to the second aspect of the present invention, has upstream optical fibers 102 extending longitudinally and having respective end surfaces 102a, a downstream optical fiber 104 extending longitudinally and having an end surface 104a which is opposed to the end surfaces 102a of the upstream fibers 102, and an optical waveguide disposed between the upstream fibers 102 and the downstream fiber 104 so that light is transmitted from the upstream fibers 102 to the downstream fiber 104. The optical element combination structure 101 further has a substrate 110 on which V-shaped cross-sectional grooves are formed for receiving and positioning the upstream fibers 102 and the downstream fiber 104, an upstream holding block 112 for covering the upstream fibers 102 and pushing them against the substrate 110, a downstream holding block 114 for covering the downstream fiber 104 and pushing it against the substrate 110, and an adhesive 116 with which spaces between any two of the substrate 110, the fibers 102, 104 and the holding blocks 112, 114 are filled to fix them to each other.

The upstream fibers 102 and the downstream fiber 104 have respective optical fiber cores 102b, 104b and respective optical fiber clads 102c, 104c disposed around the respective fiber cores 102b, 104b. The waveguide 106 has a waveguide core 106a aligned with the fiber cores 102b, 104b of the upstream fibers 102 and the downstream fiber 104, and a waveguide clad 106b disposed around the waveguide core 106a. The upstream fibers 102 are a plurality of optical fibers disposed parallel to each other in a lateral direction relative to the longitudinal direction. In the present embodiment, the number of the upstream fibers is two, the number of the downstream fibers is one, and thus the optical element combination structure 101 defines an optical coupler. Therefore, the number of upstream end portions 106c of the waveguide core 106a is two so that the upstream end portions 106c are respectively aligned with two upstream fibers 102. As the two waveguide cores 106a are viewed in a direction toward a downstream portion 106d thereof, it is seen that they become close to each other and then are integrated into one waveguide core 106a so that it is aligned with the one downstream fiber 104 at the downstream portion 106d thereof Diameters of the fibers 102, 104 are, for example, 125 μm. Further, the fiber cores 102a, 104a are made of, for example, quartz. The waveguide core 106a is made of, for example, a polymer material or quartz.

The substrate 110 is a substrate that is common to the upstream fibers 102, the waveguide 106 and the downstream fiber 104. The substrate 110 has an upstream portion 110a to which the upstream fibers 102 are fixed, an intermediate portion 110b on which the waveguide 106 is integrally formed, and a downstream portion 110c to which the downstream fiber 104 is fixed. An upstream recess 118 and a downstream recess 120, each of which is opened upward and laterally, are respectively formed between the upstream portion 110a and the intermediate portion lob and between the intermediate portion 110b and the downstream portion 110c. The upstream recess 118 is defined by a downstream end surface 118a of the upstream portion 110a, and an upstream end surface 118b of the intermediate portion 110b and the waveguide 106. The downstream end surface 118a and the upstream end surface 118b are parallel to each other and are inclined toward upstream as they are viewed in a downward direction. Further, the downstream recess 120 is defined by a downstream end surface 120a of the intermediate portion 10b and the waveguide 106, and an upstream end surface 120b of the downstream portion 110c. The downstream end surface 120a and the upstream end surface 120b are parallel to each other and are inclined downstream as they are viewed in a downward direction. Longitudinal widths of the upstream recess 118 and the downstream recess 120 are about 100-200 μm and inclined degrees thereof relative to an up-down direction are about 4-8 degrees.

At the upstream portion 110a, the upstream fibers 102 are disposed to protrude into the upstream recess 118 and, at the downstream portion 110c, the downstream fiber 104 is disposed to protrude into the downstream recess 120. The end surfaces 102a of the upstream fibers 102 and the end surface 104a of the downstream fiber 104 are preferably as close to the waveguide 106 as possible, but actually a gap of about 10-20 μm is formed between the end surfaces 102a, 104a of the fibers 102, 104 and the waveguide 106 to facilitate automatic assembly of the fibers 102, 104.

The upstream portion 110a of the substrate 110 has a flat upper surface 122 on which V-shaped cross-sectional grooves 108 corresponding to the upstream fibers 102 are formed. In the present embodiment, two V-shaped cross-sectional grooves 108 are provided on the upper surface 122, each groove extending longitudinally and disposed parallel to the other groove in a lateral direction to receive the upstream fiber 102 and position it. Each of the V-shaped cross-sectional grooves 108 is defined by two groove surfaces 124. These two groove surfaces 124 are formed so that, when the upstream fiber 102 having a known outer diameter is disposed onto and abutted on the two groove surfaces 124, the upstream fiber 102 and the waveguide 106 are aligned with each other with submicron accuracy. When the upstream fiber 102 is disposed onto the groove 108, two locations 126 where a distance between the upstream fiber 102 and the groove surface 124 is the smallest at each groove surface 124 are defined and a space 128 surrounded by the upstream fiber 102 and the groove surfaces 124 is formed.

The upper holding block 112 has a contact portion 130a, an intermediate portion 132a and a contact portion 130b, which portions are disposed longitudinally in turn from the endsurface side of the upstream fiber 102. In the present embodiment, the contact portions 130a, 130b are provided at longitudinally opposed end portions of the upstream holding block 112 and one intermediate portion 132a is formed between the contact portions 130a and 130b. The contact portions 130a, 130b are portions where, when the upstream fibers 102 are pushed toward the substrate 110 by the upstream holding member 112, the upstream holding member 112 contacts the upstream fibers 102 and pushes them against the substrate 110. The intermediate portion 132a is a portion where, when the upstream fibers 102 are pushed toward the substrate 110 by the upstream holding member 112, the upstream holding member 112 is spaced from the upstream fibers 102 via the adhesive 116.

Figure 10:
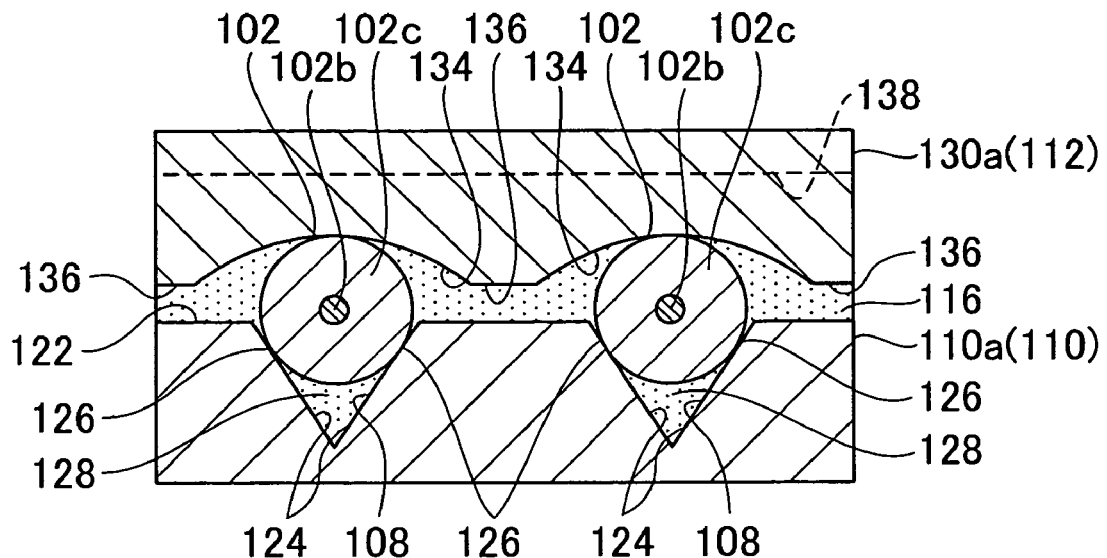
FIG. 10 is a cross-sectional view taken along the line X-X in FIG. 9.

As shown in FIG. 10, the contact portion 130a has contact surfaces 134 contacting the upstream fibers longitudinally and pushing them against the substrate 110, and opposed surfaces 136 provided on the opposed sides of each upstream fiber 102 and opposed to the upper surface 122 of the substrate 110. In the present embodiment, each of the contact surfaces 134 defines a recess recessed relative to the opposed surface 136 and curved to cover the upstream fiber 102. Gaps are formed between the opposed surfaces 136 located on the opposed sides of the recess and the upper surface 122 of the substrate 110. A distance between the opposed surface 136 and the upper surface 122 of the substrate 110 is preferably 20-40 μm and more preferably 20-30 μm.

The contact portion 130b has a structure similar to that of the contact portion 130a and thus an explanation of the contact portion 130b is omitted.

The intermediate portion 132a has a flat lower surface 138 opposed to the upper surface 122 of the substrate 110 and extending across the upstream fibers 102. In the present embodiment, the lower surface 138 is a plane substantially parallel to the upper surface 122 of the substrate 110. Thus, a distance between the lower surface 138 of the intermediate portion 132a and the upper surface 122 of the substrate 110 is greater than that between the opposed surfaces 136 of the contact portions 130a, 130b and the upper surface 122 of the substrate 110.

Longitudinal lengths of the contact portions 130a, 130b are preferably 0.5-5 times the diameter of the upstream fiber 102 and more preferably 2-3 times the same. Further, a longitudinal length of the intermediate portion 132a is preferably 1-8 times the diameter of the upstream fiber 102 and more preferably 5-7 times the same. Thus, when the diameter of the upstream fiber 102 is 125 μm, the longitudinal lengths of the contact portions 130a, 130b are preferably 60-625 μm and more preferably 250-375 μm. Further, the length of the intermediate portion 132a is preferably 125-1000 μm and more preferably 625-875 μm.

Figure 12:
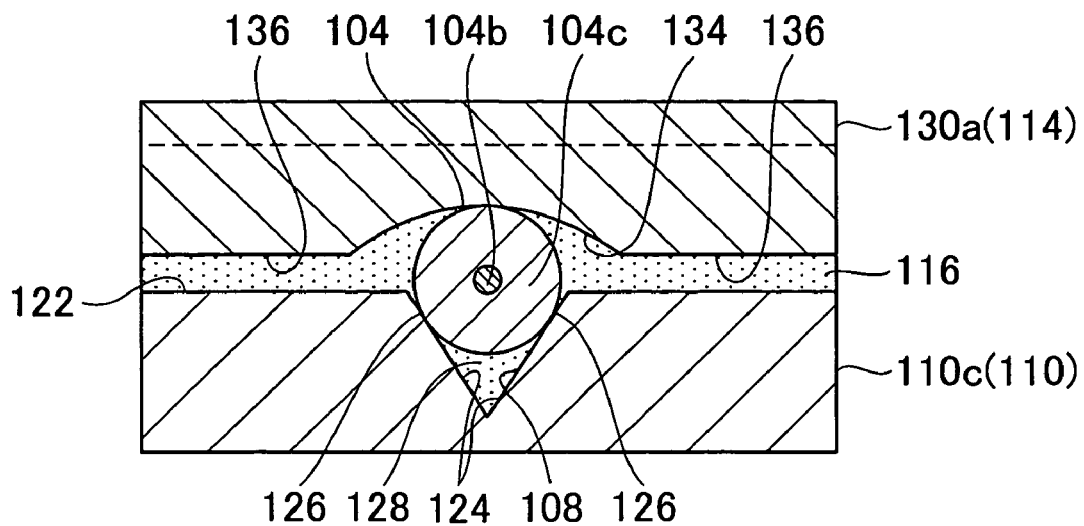
FIG. 12 is a cross-sectional view taken along the line XII-XI in FIG. 9.
Figure 13:
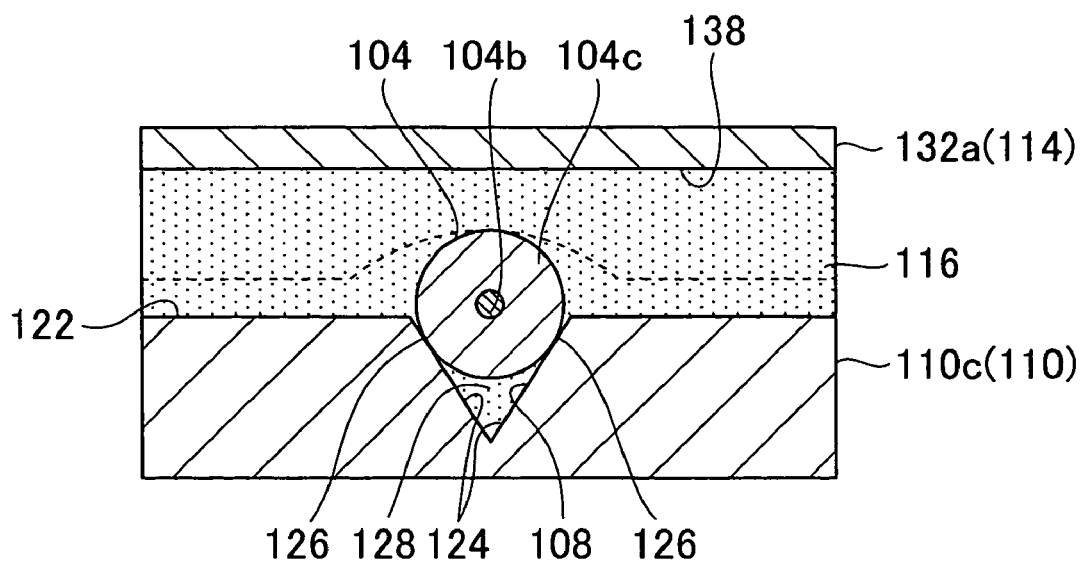
FIG. 13 is a cross-sectional view taken along the line XIII-XIII in FIG. 9.

As shown in FIGS. 9, 12 and 13, the downstream portion 110c of the substrate 110 and the downstream holding block 114 are respectively formed symmetrically to the upstream portion 110a of the substrate 110 and the upstream holding block 112 with respect to the waveguide 106 except that structures of the downstream portion 110c and the downstream holding block 114 are revised so that the number of the upstream fibers 102 is changed to the number of the upstream fibers 104. Thus, regarding components of the downstream portion 110c of the substrate 110 and the downstream holding block 114 similar to components of the upstream portion 110a of the substrate 110 and the upstream holding block 112, reference numbers the same as those attached to the latter components are attached to the former components and an explanation of the former components is omitted. Cross-sections of the optical element combination structure 101 at a contact portion 130a and an intermediate portion 132a of the downstream holding block 114 are respectively shown in FIGS. 12 and 13.

Any values of viscosity of the adhesive 116 are allowable, but a value thereof is preferably 20,000-40,000 mPa·s to decrease fluctuation of coupling loss of the optical element combination structure 101 derived from a change in temperature. Any values of elastic modulus and coefficient of linear expansion of the adhesive 116 are also allowable, but a value of the former is preferably 0.01-3.0 GPa and a value of the latter is preferably 20-100 ppm/° C. The adhesive 116 is, for example, an ultraviolet curing type epoxy resin "WR8774" (The value of viscosity thereof is 30,000 mPa·s, the value of elastic modulus thereof is 2.5 GPa, and the value of coefficient of linear expansion thereof is 62 ppm/° C.) manufactured by Kyoritsu Chemical Co. Ltd.

The upstream recess 118 and the downstream recess 120 are filled with a coupling agent 144, the type of which is different from that of the adhesive 116. It is necessary for the coupling agent 144 to be transparent relative to light because light is transmitted between the fibers and the waveguide. Further, it is preferable that a value of refractive index of the coupling agent 144 be substantially the same as that of refractive index of the fiber core 102b, 104b. The coupling agent 144 may be an adhesive, a gel compound, or a filler. The coupling agent 144 is, for example, a cation curing type silicone resin "WR8962H" manufactured by Kyoritsu Chemical & Co., Ltd.

Next, an example of a way of manufacturing an optical element combination structure 101 which is the first embodiment according to the second aspect of the present invention will be explained. A substrate 110 made of a material such as silicon and a polymer material is prepared and, by anisotropic etching the substrate 110 according to a resist pattern formed by means of photolithography, the substrate 110 is formed with V-shaped cross-sectional grooves 108. Then, the substrate 110 having the V-shaped cross-sectional grooves 108 is formed with an optical waveguide 106. Specifically, in a case where a waveguide 106 is made of a polymer material, after a clad layer 106b and a core layer on the clad layer 106b are formed by spin coating or molding, a waveguide core 106a having a rectangular cross section is formed from the core layer by means of a process such as photolithography and reactive ion etching or by means of a machining process such as crimping. Then, a further clad layer 106b is formed in a manner similar to the forming way mentioned above to cover the waveguide core 106a so that a waveguide 106 is formed. Also, in a case where a waveguide 106 is made of quartz, after a quartz layer is formed on the substrate 110 by means of a process such as flame hydrate deposition and CVD, a quartz core 106a having a rectangular cross section is formed by means of a process such as dry etching and then clad layer 106b is formed to cover the quartz core 106a so that a waveguide 106 is formed. The steps of forming the V-shaped cross-sectional grooves 108 and forming waveguide 106 are performed so that a positional relationship between the groove surfaces 124 and the waveguide 106 is obtained, namely, when the fibers 102, 104 are disposed onto the groove surfaces 124 of the grooves 108, the fibers 102, 104 and the optical waveguide 4 are aligned with each other with submicron accuracy. Then, the upstream recess 118 and the downstream recess 120 are formed by means of dicing and so on.

Next, an appropriate amount of adhesive 116 is applied into the grooves 108 and onto the upper surface 122 of the substrate 110. The fibers 102, 104 are arranged on the groove surfaces 124 so that the end surfaces 102a, 104a of the fibers 102, 104 respectively protrude into the upstream recess 118 and the downstream recess 120. If necessary, an appropriate amount of adhesive 116 is additionally applied onto the fibers 102, 104. By pushing the holding members 112, 114 onto the fibers 102, 104 for a predetermined time at the predetermined pressure, the fibers 102, 104 are urged closely to the groove surfaces 124. During the pushing of the holding members 112, 114, it should be noted that no bubbles are introduced between the holding members 112, 114 and the substrate 110.

Figure 11:
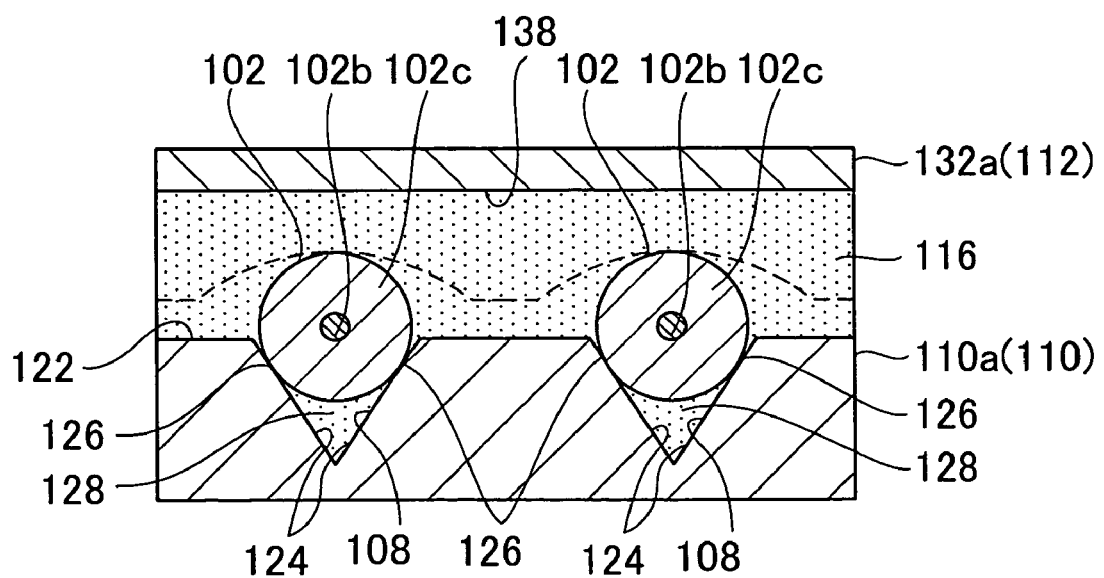
FIG. 11 is a cross-sectional view taken along the line XI-XI in FIG. 9.

Specifically, the adhesive 116 disposed in spaces 128 between the fibers 102, 104 and the grooves 108 does not move out from gaps 126 between the fibers 102, 104 and the groove surfaces 124 at cross sections of the contact portions 130a, 130b (see FIGS. 10 and 12), but instead moves into spaces between the fibers 102, 104 and the grooves 108 at cross sections of the intermediate portion 130b (see FIGS. 11 and 13). Then the adhesive 116 moves out from gaps 126 between the fibers 102, 104 and the groove surfaces 124 at the cross sections of the intermediate portion 132a and moves into spaces between the lower surfaces 138 of the holding members 112, 114 and the upper surfaces 122 of the substrate 110 (see FIGS. 11 and 13). Further, the adhesive 116 disposed in a space between the two fibers 102 at cross sections of the contact portions 130a, 130b of the upstream holding block 112 (see FIG. 10) moves into a space between the two fibers 102 at a cross section of the intermediate portion 132a (see FIG. 11). Then, the adhesive 116 moves over the fibers 102. Thus, the fibers 102, 104 are firmly pushed onto the groove surfaces 124 of the V-shaped cross-sectional groove 108 at the contact portions 130a, 130b.

Then, the adhesive 116 is cured by, for example, irradiating an ultraviolet ray, whereby the substrate 110, the fibers 102, 104 and the holding members 112, 114 are fixed to each other. Then, the coupling agent 144 is applied into the upstream recess 118 and the downstream recess 120 and is cured by, for example, irradiating an ultraviolet ray.

Figure 14:
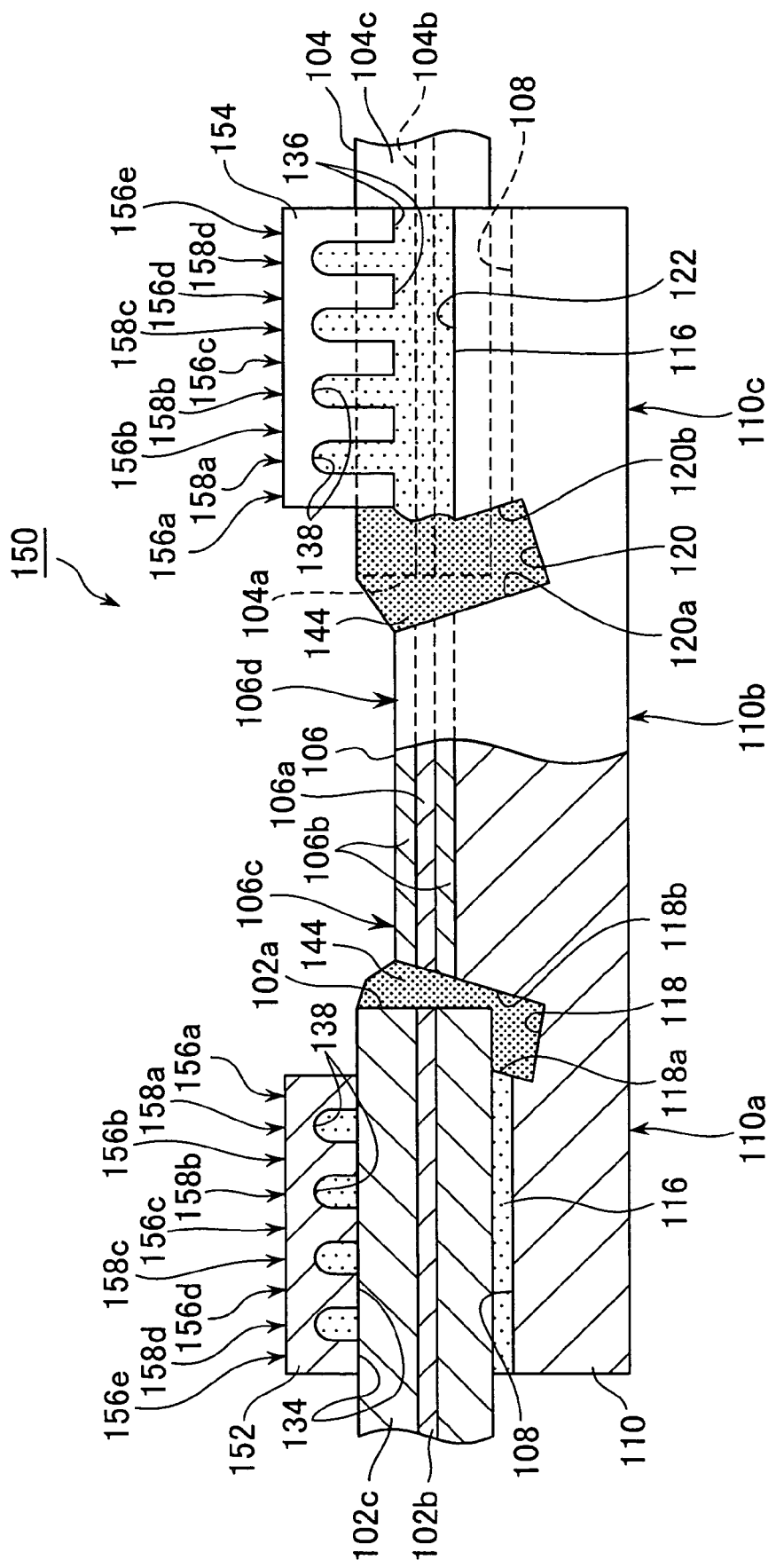
FIG. 14 is a partially cross-sectional front view of an optical element combination structure which is a second embodiment of the second aspect of the present invention.

Next, referring to FIG. 14, a second embodiment of the optical fiber structure according to the second aspect of the present invention will be explained. FIG. 14 is a partially fragmental front view of an optical element combination structure which is a second embodiment according to the second aspect of the present invention and in which V-shaped cross-sectional grooves and an optical waveguide are integrally formed.

An optical element combination structure 150 which is a second embodiment according to the second aspect of the present invention is similar to the above-mentioned optical element combination structure 101 of the first embodiment according thereto, except that the upstream holding block 112 and the downstream holding block 114 are respectively replaced with an upstream holding block 152 and a downstream holding block 154. Thus, regarding components of the second embodiment according to the second aspect of the present invention similar to components of the first embodiment according thereto, reference numbers the same as those attached to the latter components are attached to the former components and an explanation of the former components is omitted. Now, portions of the second embodiment different from those of the first embodiment will be explained.

The optical element combination structure 150 has the upstream holding block 152 for covering the upstream fibers 102 and pushing them against the substrate 110, and the downstream holding block 154 for covering the downstream fiber 103 and pushing it against the substrate 110.

The upstream holding block 152 has five contact portions 156a-156e and four intermediate portions 158a-158d which portions are longitudinally and alternatively disposed adjacent to each other from an end-surface side of the upstream fiber 104. In the present embodiment, the contact portions 156a, 156e are disposed at the respective opposed end portions in the longitudinal direction of the upstream holding block 152. The contact portions 156a-156e are portions where, when the upstream fibers 102 are pushed toward the substrate 110 by the upstream holding member 152, the upstream holding member 152 contacts the upstream fibers 102 and push them against the substrate 110. The intermediate portions 158a-158d are portions where, when the upstream fibers 102 are pushed toward the substrate 110 by the upstream holding member 152, the upstream holding member 152 is spaced from the upstream fibers 102 via the adhesive 116.

Each of the contact portions 156a-156e has components similar to those of the contact portion 130a of the optical element combination structure 101 which is the first embodiment according to the second aspect of the present invention (see FIG. 10). Further, each of the intermediate portions 158a-158d has components similar to those of the intermediate portion 132a of the optical element combination structure 101 which is the first embodiment according to the second aspect of the present invention (see FIG. 1). Thus, regarding components of the second embodiment according to the second aspect of the present invention similar to components of the first embodiment according thereto, reference numbers the same as those attached to the latter components are attached to the former components and an explanation of the components of the contact portions 156a-156e and the intermediate portions 158a-158d is omitted.

The downstream holding block 154 is formed symmetrically to the upstream holding block 152 with respect to the waveguide 106 except that structures of the upstream holding block 152 is revised so that the number of the upstream fibers 102 is changed to the number of the downstream fibers 104. Thus, regarding components of the downstream holding block 154 similar to components of the upstream holding block 152, reference numbers the same as those attached to the latter components are attached to the former components and an explanation of the former components is omitted. Cross sections of the optical element combination structure 150 at the contact portions 156a-156e and the intermediate portions 158a-158d of the downstream holding block 154 are respectively those of the optical element combination structure 101, which is the first embodiment according to the second aspect of the present invention, at the contact portion 130a and the intermediate portion 132a shown in FIGS. 12 and 13.

An example of a way of manufacturing an optical element combination structure 150 which is the second embodiment according to the second aspect of the present invention is similar to that of manufacturing the optical element combination structure 101 which is the first embodiment according thereto except that the upstream holding block 112 and the downstream holding block 114 of the combination structure 101 of the first embodiment are respectively replaced with the upstream holding block 152 and the downstream holding block 154, and thus an explanation thereof is omitted.

Figure 7:
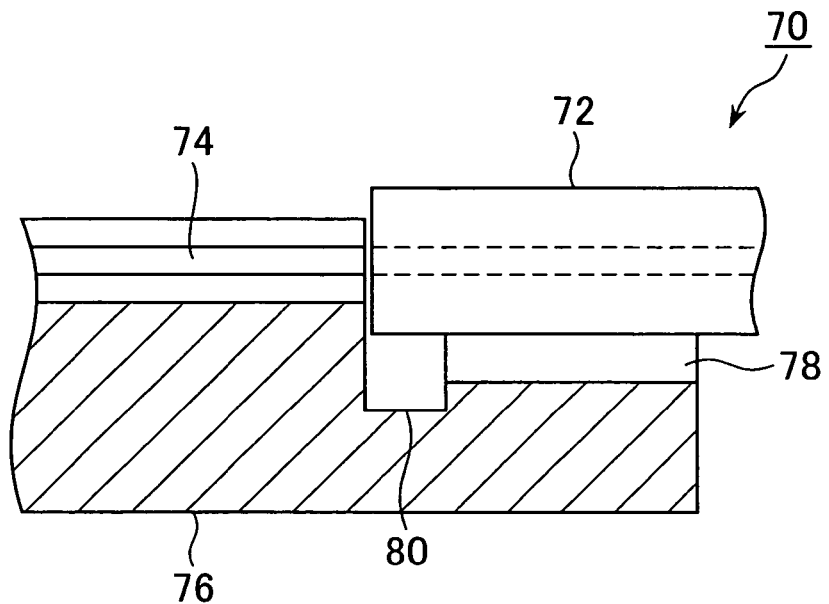
FIG. 7 is a front view of an optical element combination structure in the prior art.
Figure 8:
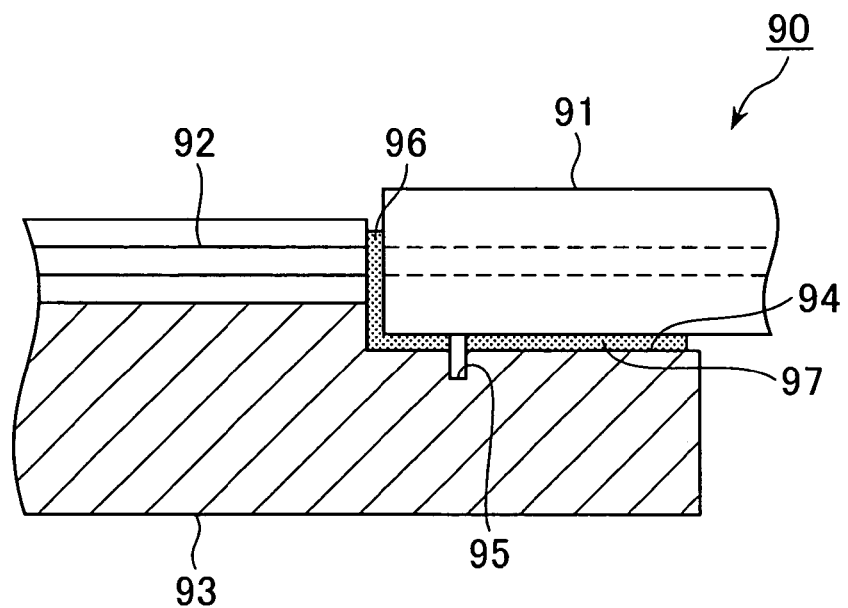
FIG. 8 is a cross-sectional front view of another optical element combination structure in the prior art.
Figure 15:
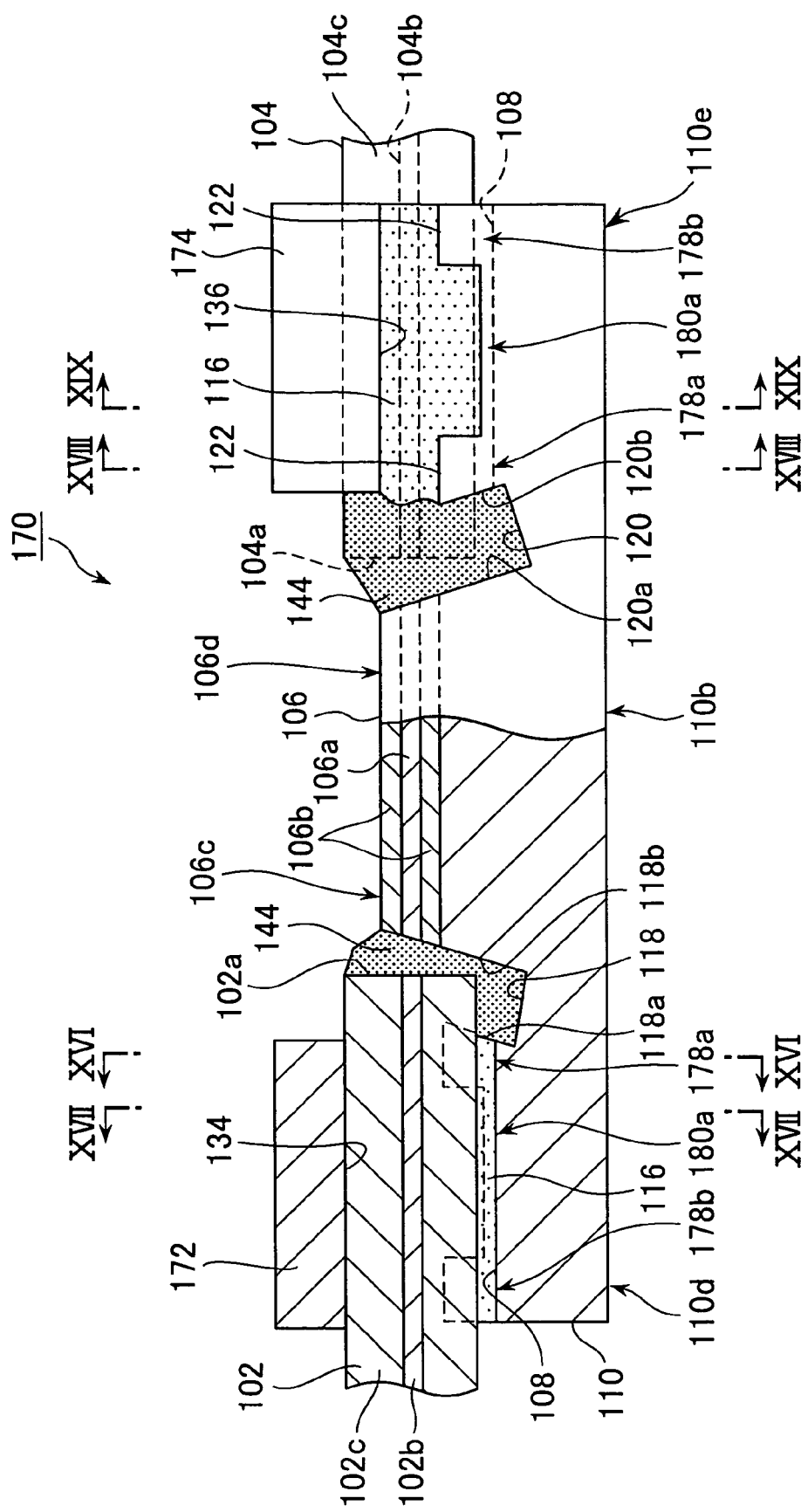
FIG. 15 is a partially cross-sectional front view of an optical element combination structure which is a third embodiment of the second aspect of the present invention.

Next, referring to FIGS. 15-19, a third embodiment of the optical fiber structure according to the second aspect of the present invention will be explained. FIG. 15 is a partially fragmental front view of an optical element combination structure which is a third embodiment of the second aspect of the present invention and in which V-shaped cross-sectional grooves and an optical waveguide are integrally formed. FIGS. 16-19 are respective cross-sectional views along lines XVI-XVI, XVII-XVII, XVIII-XVIII and XIX-XIX shown in FIG. 7.

An optical element combination structure 170 which is a third embodiment according to the second aspect of the present invention is similar to the above-mentioned optical element combination structure 101 of the first embodiment according thereto except that the upstream portion 110a and the downstream portion 110c of the substrate 110 of the combination structure 101 of the first embodiment are respectively replaced with an upstream portion 110d and a downstream portion 110e, and the upstream holding block 112 and the downstream holding block 114 are respectively replaced with an upstream holding block 172 and a downstream holding block 174. Thus, regarding components of the third embodiment similar to components of the first embodiment, reference numbers the same as those attached to the latter components are attached to the former components and an explanation of the former components is omitted. Now, portions of the third embodiment different from those of the first embodiment will be explained.

Figure 16:
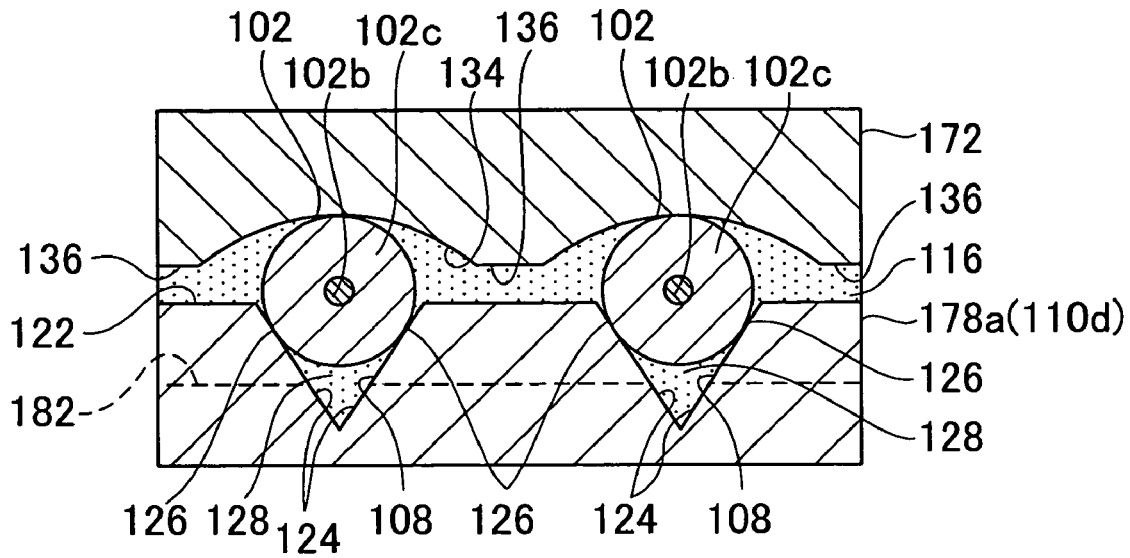
FIG. 16 is a cross-sectional view taken along the line XVI-XVI in FIG. 15.
Figure 17:
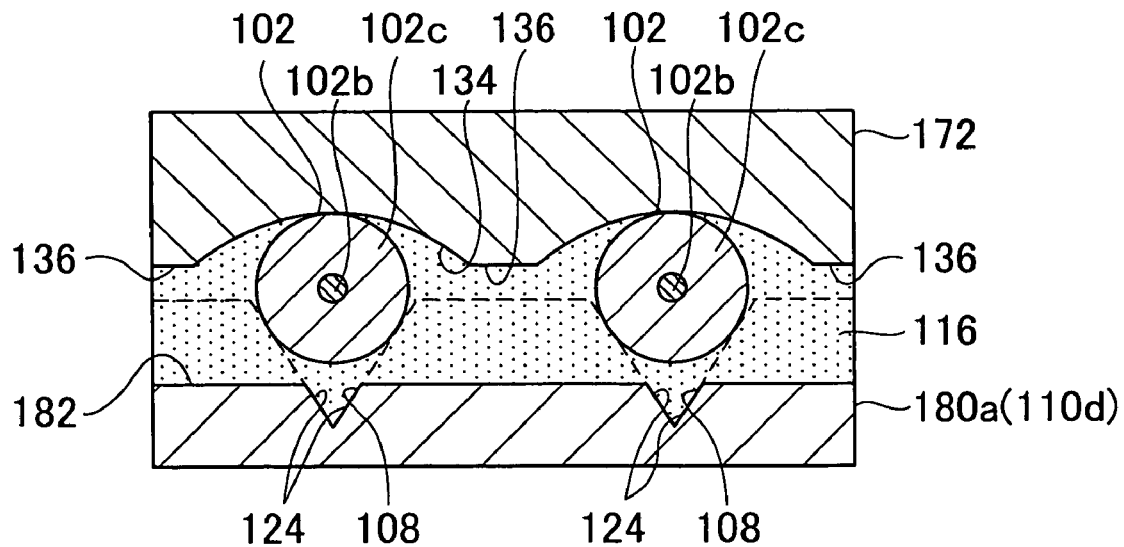
FIG. 17 is a cross-sectional view taken along the line XVII-XVII in FIG. 15.

As shown in FIGS. 16 and 17, an upstream holding block 172 has a structure similar to that of the contact portion 130a of the upstream holding block 112 of the combination structure 101 which is the first embodiment according to the second aspect of the present invention. Thus, regarding components of the upstream holding block 172 similar to components of the contact portion 130a of the first embodiment according thereto, reference numbers the same as those attached to the latter components are attached to the former components and an explanation of the former components is omitted.

The upstream portion 110d of the substrate 110 has a grooved portion 178a, an intermediate portion 180a and a grooved portion 178b, which portions are disposed longitudinally in turn from an end-surface side of the upstream fibers 102. In the present embodiment, the grooved portions 178a, 178b are provided at longitudinally opposed end portions of the upstream portion 110d and the intermediate portion 180a is provided between the grooved portions 178a and 178b.

As shown in FIG. 16, the grooved portion 178a has a structure similar to that of the upstream portion 110d of the combination structure 101 which is the first embodiment according to the second aspect of the present invention. Further, the grooved portion 178b has a structure similar to that of the grooved portion 178a. Thus, regarding components of the grooved portions 178a, 178b similar to components of upstream portion 110d of the combination structure 101, reference numbers the same as those attached to the latter components are attached to the former components and an explanation of the former components is omitted.

As shown in FIG. 17, when the upstream fibers 102 are pushed toward the substrate 110 by the upstream holding member 172, the intermediate portion 180a is spaced from the upstream fibers 102 via the adhesive 116. Further, the intermediate portion 180a has a flat upper surface 182 which is opposed to the upstream holding block 172 and extends across the upstream fibers 102a. In the present embodiment, the upper surface 182 is a flat surface substantially parallel to the upper surface 122 of the grooved portion 178a. The upper surface 182 is provided with a continuous part of the grooves 108 of the grooved portions 178a, 178b, but it may not be provided therewith. A distance between the upper surface 182 of the intermediate portion 180a and the opposed surfaces 136 of the upstream holding block 172 is larger than that between the upper surfaces 122 of the grooved portions 178a, 178b and the opposed surfaces 136 of the upstream holding block 172.

Longitudinal lengths of the grooved portions 178a, 178b are preferably 2-3 times the diameter of the upstream fiber 102. Further, a longitudinal length of the intermediate portion 180a is preferably larger than five times the diameter of the upstream fiber 102. Thus, when the diameter of the upstream fiber 102 is 125 μm, the longitudinal lengths of the grooved portions 178a, 178b are preferably about 250-375 μm, and the longitudinal length of the intermediate portion 180a is preferably larger than 625 μm.

Figure 18:
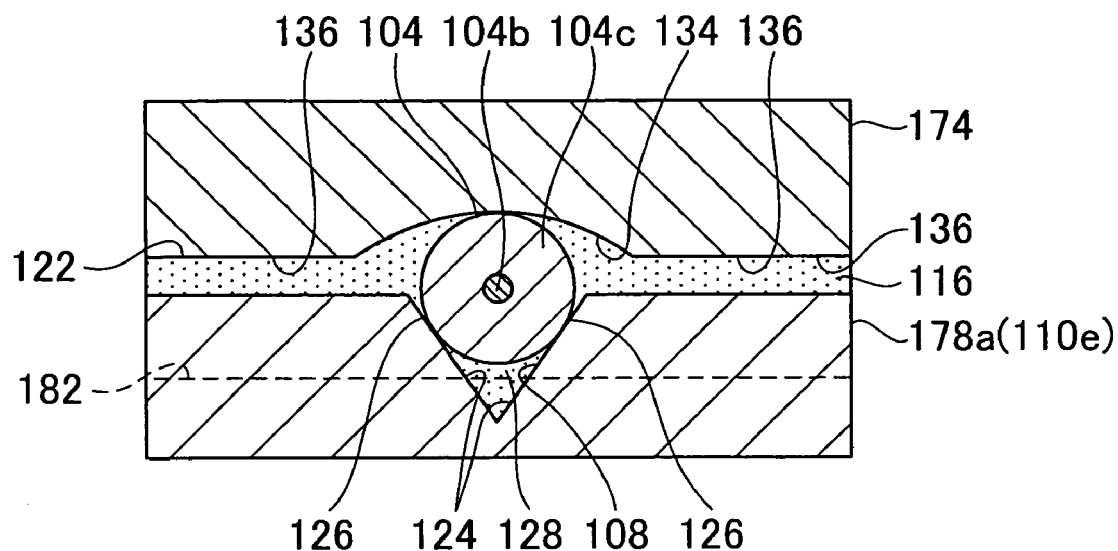
FIG. 18 is a cross-sectional view taken along the line XVIII-XVIII in FIG. 15.
Figure 19:
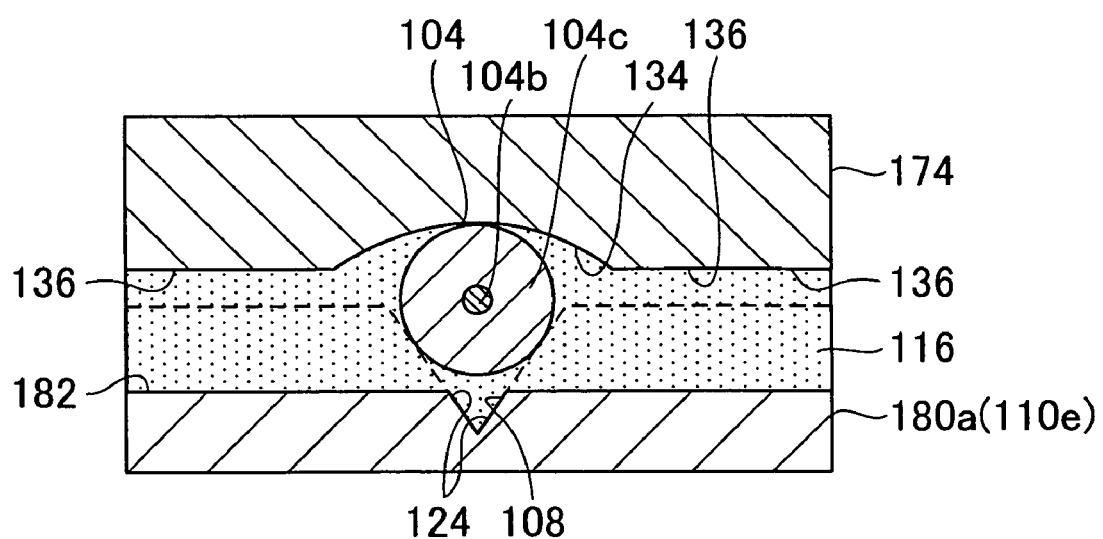
FIG. 19 is a cross-sectional view taken along the line XIX -XIX in FIG. 15.

As shown in FIGS. 15, 18 and 19, the downstream portion 110e of the substrate 110 and the downstream holding block 174 are respectively formed symmetrically to the upstream portion 110d of the substrate 110 and the upstream holding block 172 with respect to the waveguide 106 except that structures of the downstream portion 110e of the substrate 110 and the downstream holding block 174 are revised so that the number of the upstream fibers 102 is changed to the number of the upstream fibers 104. Thus, regarding components of the downstream portion 110e of the substrate 110 and the downstream holding block 174 similar to components of the upstream portion 110d of the substrate 110 and the upstream holding block 172, reference numbers the same as those attached to the latter components are attached to the former components and an explanation of the former components is omitted. Cross sections of the optical element combination structure 170 at the grooved portion 178a and the intermediate portion 180a of the downstream holding block 174 are respectively shown in FIGS. 18 and 19.

An example of a way of manufacturing an optical element combination structure 170 which is the third embodiment according to the second aspect of the present invention is similar to that of manufacturing the optical element combination structure 101 which is the first embodiment according thereto except that the upstream holding block 112 and the downstream holding block 114 of the combination structure 101 are respectively replaced with the upstream holding block 172 and the downstream holding block 174 of the combination structure 170, and that a step of forming the upper surface 182 of the substrate 110 by dicing after the V-shaped cross-sectional grooves 108 are formed is added, and thus an explanation of the example is omitted.

Next, a comparison between examples of the optical element combination structures 101 and 150 which are respectively the first and second embodiments according to the second aspect of the present invention, and an example of the optical element combination structure 200 in the prior art will be explained. In these three optical element combination structures, diameters of the optical fibers 102, 104, 202, 204 were 125 μm, distances between the opposed surfaces 136 of the holding blocks 112, 114, 152, 154, 212, 214 and the upper surfaces 122 of the substrates 110, 210 were 30 μm, and longitudinal lengths of the holding blocks 112, 114, 152, 154, 212, 214 were 1350 μm. As the adhesive 116, an ultraviolet curing type epoxy resin "WR8774" (The value of viscosity thereof is 30,000 mPa·s, the value of elastic modulus thereof is 2.5 GPa, and the value of coefficient of linear expansion is 62 ppm/° C.) manufactured by Kyoritsu Chemical Co. Ltd. was employed.

In the optical element combination structure 101, a longitudinal length of the first contact portion 130a was 300 μm which was 2.4 times the diameter of the fiber, and a longitudinal length of the intermediate portion 132a was 750 μm which was 6 times the diameter of the fiber.

In the optical element combination structure 150, a longitudinal length of the first contact portion 130a was 110 μm which was 0.89 times the diameter of the fiber, and a longitudinal length of the intermediate portion 132a was 200 μm which was 1.6 times the diameter of the fiber.

In the optical element combination structure 200, the whole length of 1350 μm corresponds to the above-mentioned longitudinal length of the first contact portion and there are no intermediate portions.

Figure 28:
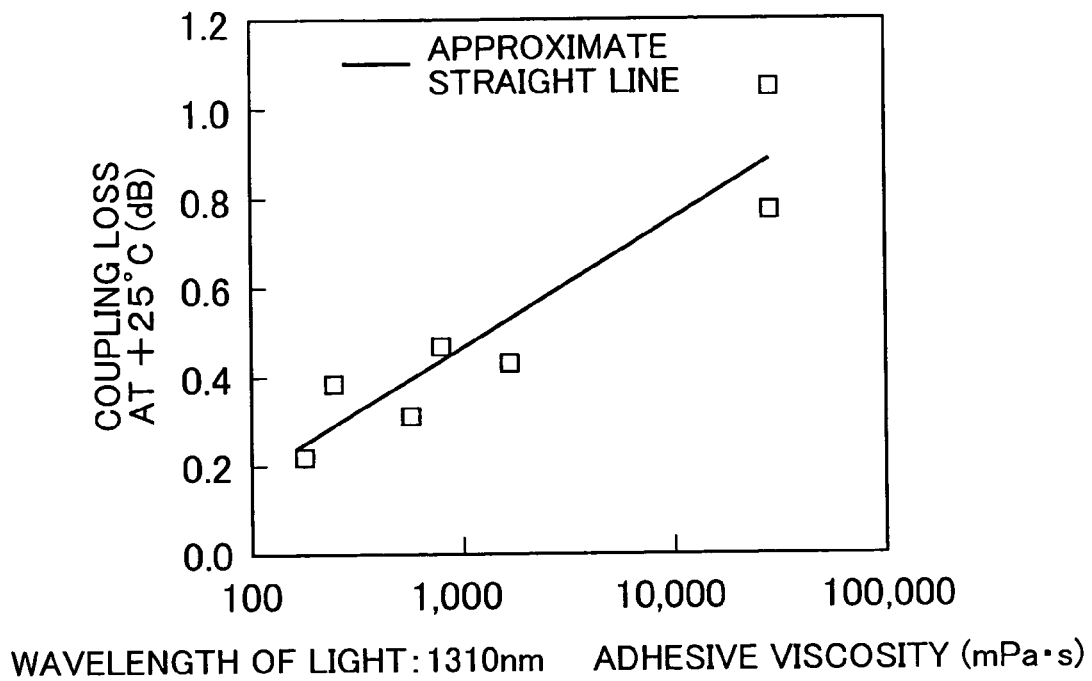
FIG. 28 is a graph showing a relationship between a value of viscosity and a measured value of coupling loss at an environmental temperature of +25° C.

The holding blocks 112, 114, 152, 154, 212, 214 were pushed onto the fibers 102, 104, 202, 204 at an appropriate pressure in an appropriate time. As a result, values of coupling loss at +25° C. of the optical element combination structures 101, 150 and 200 were respectively 0-0.4 dB, 0.13-0.47 dB and 0.77-1.05 dB (see FIG. 28). As can be seen, a value of coupling loss of the optical element combination structure according to the present invention has been improved in comparison with a value of coupling loss of the optical element combination in the prior art when an adhesive having relatively high viscosity value was employed.

Figure 29:
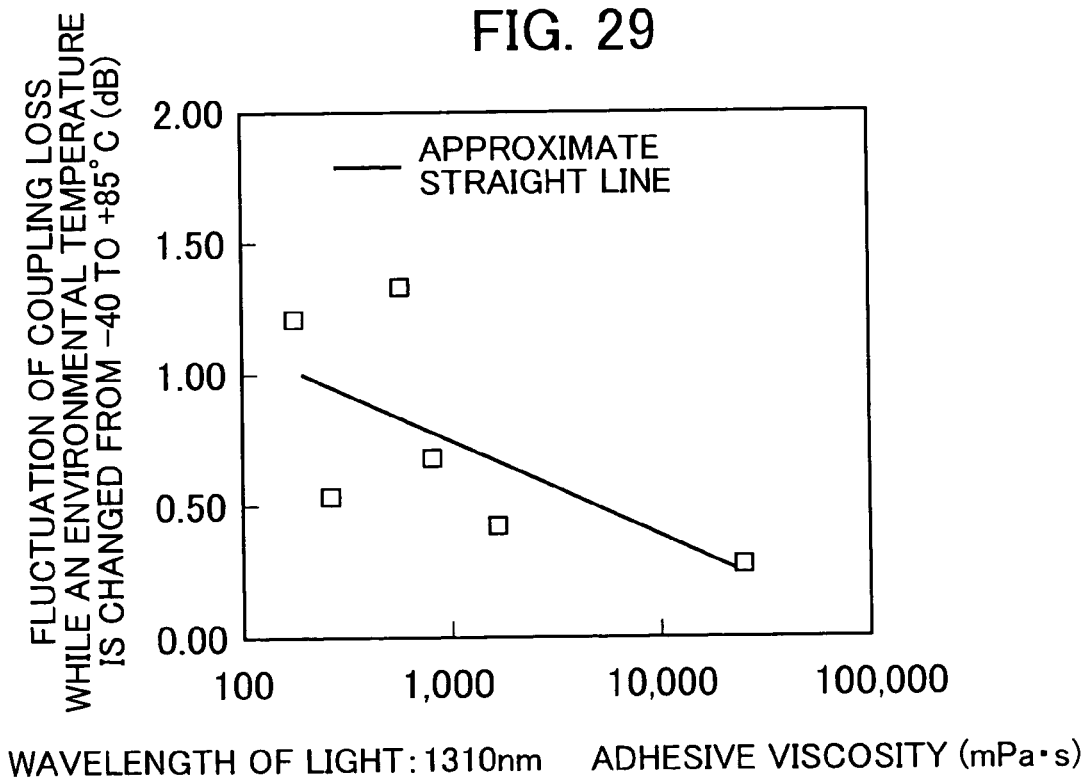
FIG. 29 is a graph showing a relationship between a value of viscosity and a measured value of coupling loss while an environmental temperature is changed from −40° C. to +85° C.
Figure 30:
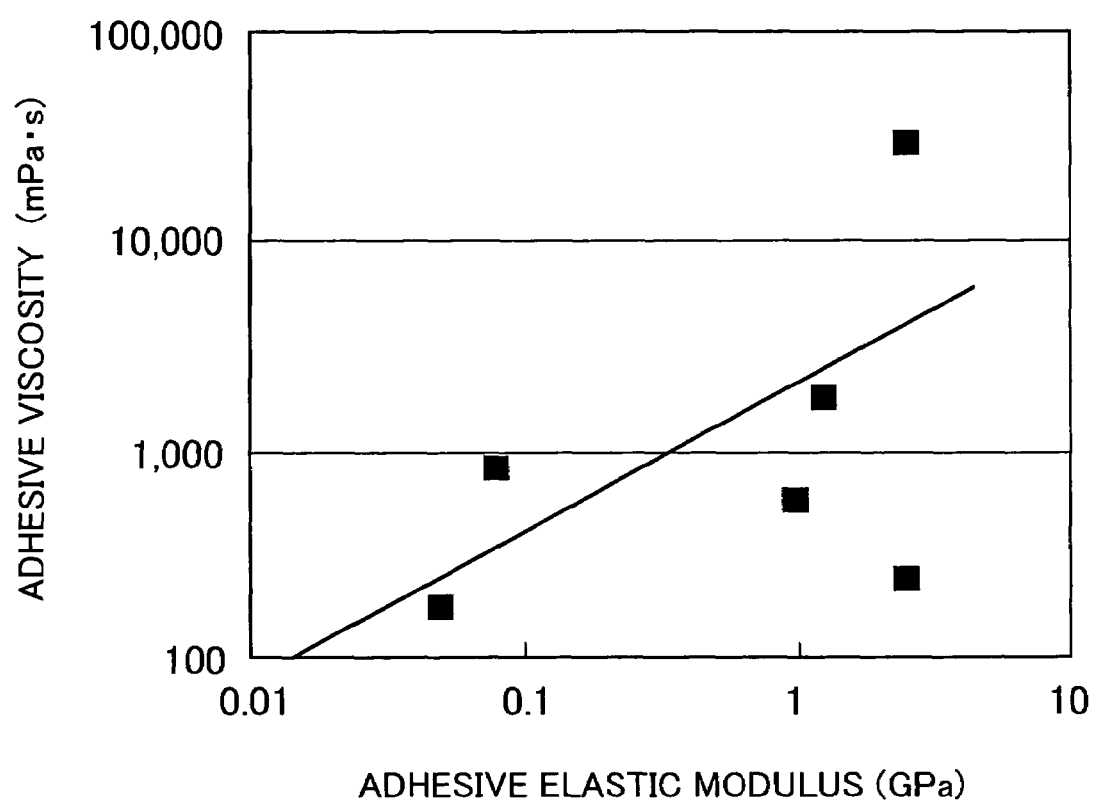
FIG. 30 is a graph showing a relationship between elastic modulus and coupling loss of an adhesive.

Further, as shown in FIG. 29, in a case where an ultraviolet curing type epoxy resin "WR8774" (The value of viscosity thereof is 30,000 mPa·s) manufactured by Kyoritsu Chemical Co. Ltd. was employed, while a temperature was changed from −40 to +85° C., a value of fluctuation of coupling loss was 0.26 dB. Since such values of coupling loss while a temperature was changed from −40 to +85° C. vary around a value of coupling loss at 25° C., the values of fluctuation of coupling loss of the optical element combination structures 101, 150 and 170 were respectively 0.13-0.17 dB, 0.26-0.60 dB and 0.90-1.18 dB. Thus, while a temperature is changed from −40 to +85° C., values of coupling loss of the optical element combination structure according to the present invention can be equal to or less than 0.6 dB, or equal to or less than 0.4 dB.

Figure 20:
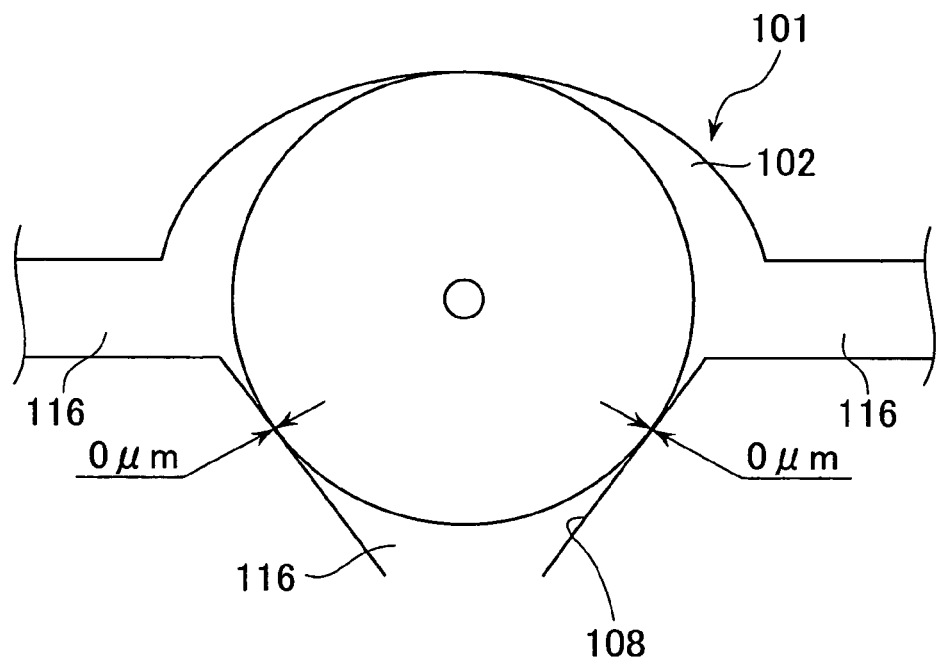
FIG. 20 is a schematic cross-sectional view of an example of an optical element combination structure at a contact portion of a holding member seen via a metallographic microscope, which example is the first embodiment according to the second aspect of the present invention.
Figure 21:
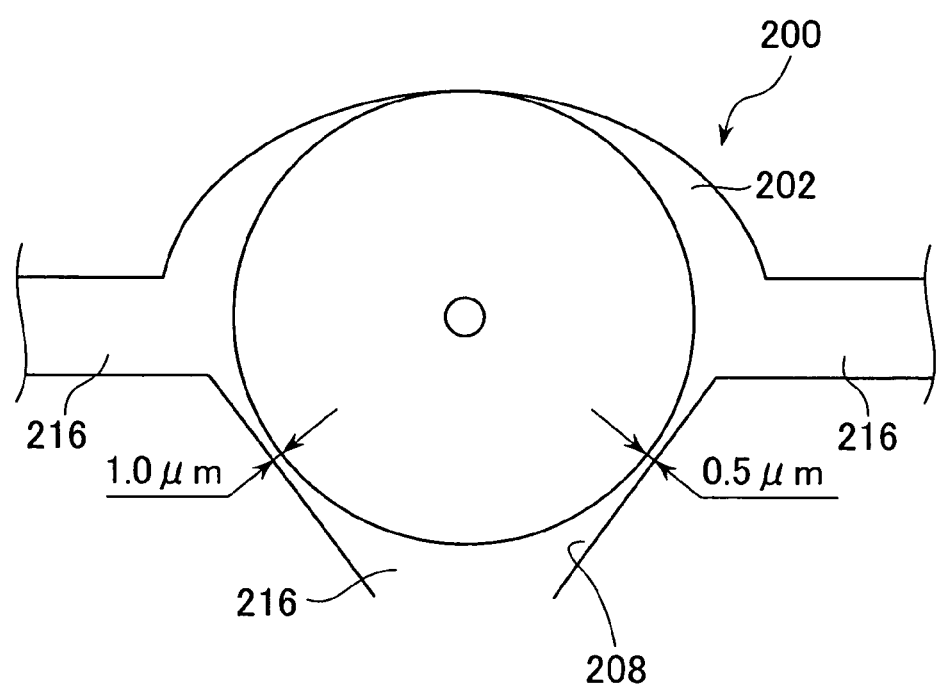
FIG. 21 is a schematic cross-sectional view of a comparative example of an optical element combination structure in the prior art at a holding block.

FIG. 20 is a schematic view seen through a metallographic microscope when a cross section is taken in a lateral direction respective to a longitudinal direction at the contact portion 130*a* of the holding block 112 of an example of the optical element combination structure 101 according to the present invention. FIG. 21 is a schematic view seen through a metallographic microscope when a cross section is taken in a lateral direction respective to a longitudinal direction of the holding block 212 of a comparative example of the optical element combination structure 200, in the prior art.

As can be seen from FIGS. 20 and 21, in the combination structure 101 according to the present invention, a gap between the fiber 102 and the groove 108 was substantially 0 μm, namely, the fiber 102 substantially contacts the groove 108 and no adhesive 116 exists in the gap therebetween. On the other hand, in the combination structure 200, in the prior art, an adhesive 216 remains in a gap of 0.5-1.0 μm between the fiber 202 and the groove 208. When a cross section is taken in a lateral direction respective to a longitudinal direction at the intermediate portion 132*a* of the holding block 112 of the example of the optical element combination structure 101 according to the present invention, it can be seen by using a metallographic microscope that an adhesive remains in a gap of 0.5-1.0 μm between the fiber 102 and the groove 108.

Figure 22:
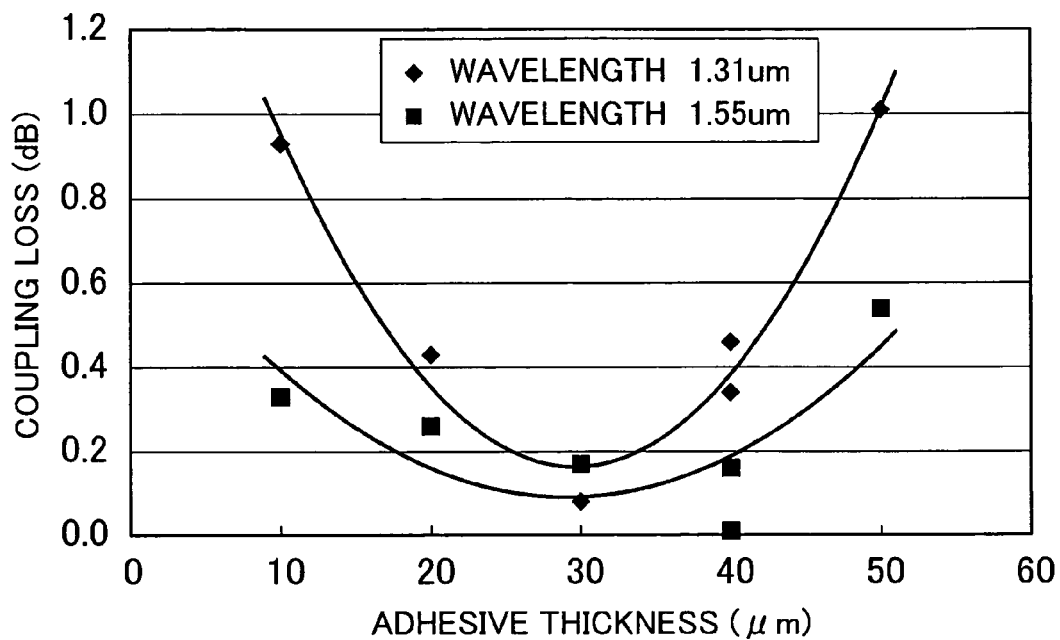
FIG. 22 is a graph showing a relationship between a thickness of an adhesive and a value of coupling loss in an experimental example.

FIG. 22 is a graph showing a relationship between a thickness of the adhesive 114, namely, a distance from the opposed surface 136 to the upper surface 122 of the substrate 110, and values of coupling loss at +25° C. in the above-mentioned example of the optical element combination structure 101 which is the first embodiment according to the second aspect of the present invention. As can be seen from FIG. 22, when the adhesive thickness was within a range of 20-40 μm, a value of coupling loss could be equal to or less than 0.5 dB. When the adhesive thickness was thinner than this range, stresses applied to the fibers 102, 104 increased and the coupling loss also increased accordingly. When the adhesive thickness was thicker than the above range, adhesiveness of the fibers 102, 104 decreased and the coupling loss increased accordingly.

Figure 23:
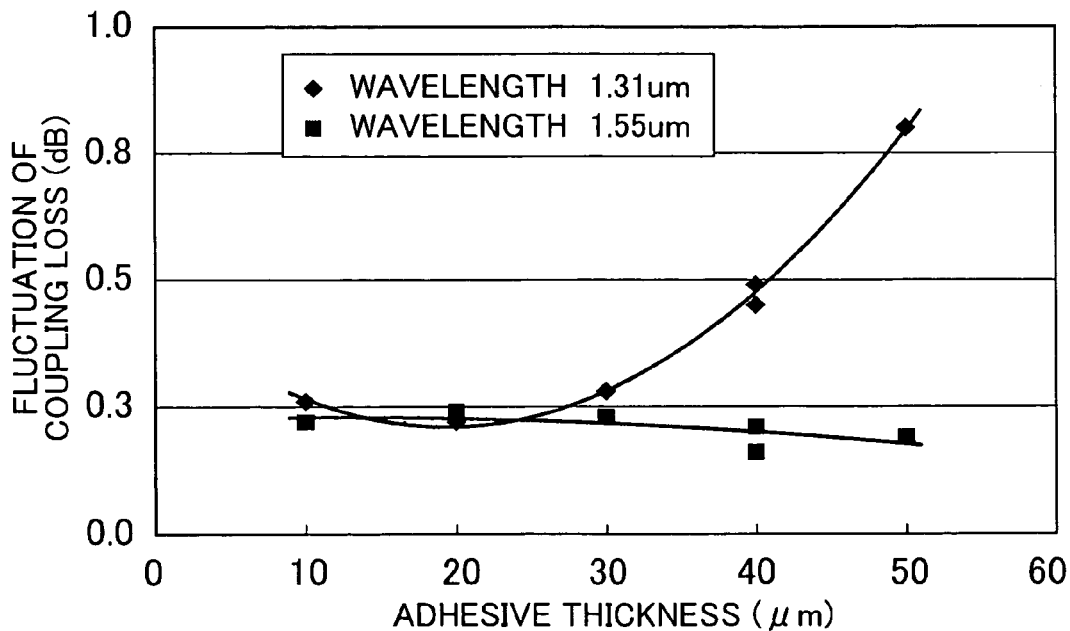
FIG. 23 is a graph showing a relationship between a thickness of an adhesive and a value of fluctuation of coupling loss in an experimental example.

FIG. 23 is a graph showing a relationship between the adhesive thickness and values of fluctuation of coupling loss when a temperature is changed from −40° C. to +85° C. in the same example as that in FIG. 22. As can be seen from FIG. 23, when the adhesive thickness was within a range of 10-30 μm, a value of fluctuation of coupling loss could be maintained equal to or less than 0.3 dB over the temperature. When the adhesive thickness was thicker than this range, adhesiveness of the fibers decreased and the fluctuation of coupling loss over the temperature increased accordingly.

Figure 24:
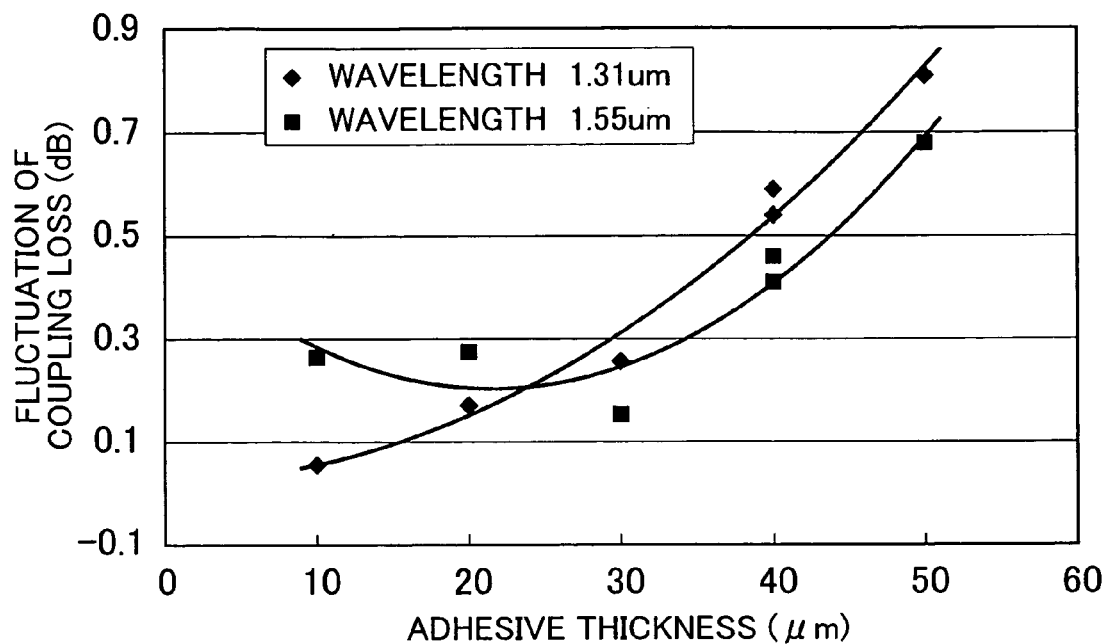
FIG. 24 is a graph showing a relationship between a thickness of an adhesive and a value of fluctuation of coupling loss in an experimental example in which a Pressure Cooker Test was performed.

FIG. 24 is a graph showing a relationship between the adhesive thickness and fluctuation of coupling loss when a Pressure Cooker Test took place (Test conditions: 121° C., 100% RH, 2 atm and retention time of 100 hours) in the same example as that in FIG. 22. As can be seen from FIG. 24, when the adhesive thickness is thicker than 30 μm, adhesiveness of the fibers decreased and the fluctuation of coupling loss increased accordingly. It should be noted that a direction of a vertical scale in FIG. 24 is defined as positive when the fluctuation of coupling loss increases after the Pressure Cooker Test.

Figure 25:
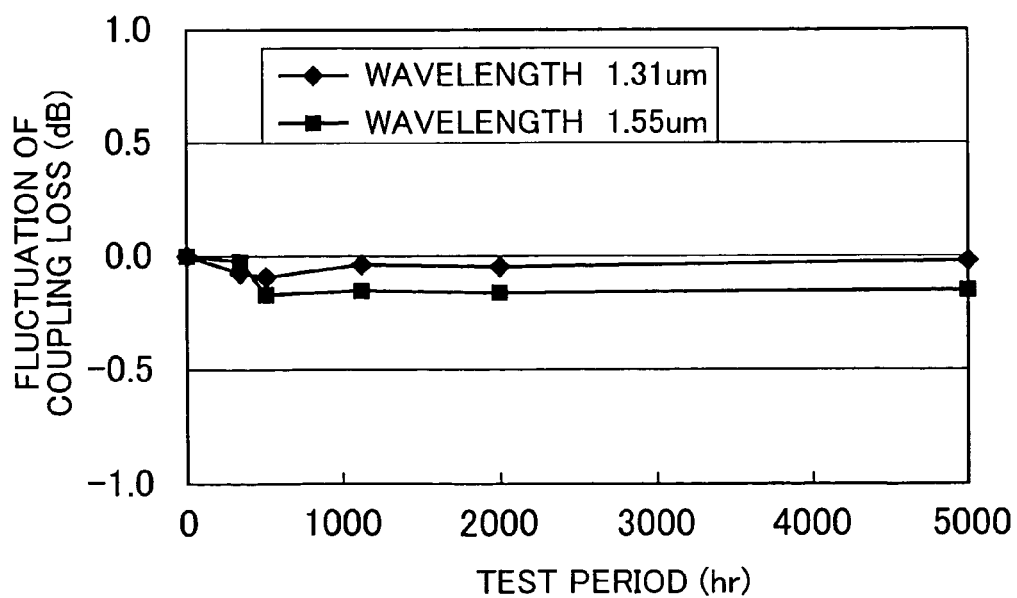
FIG. 25 is a graph showing fluctuation of coupling loss of an experimental example when a high-temperature and high-moisture test is conducted.
Figure 26:
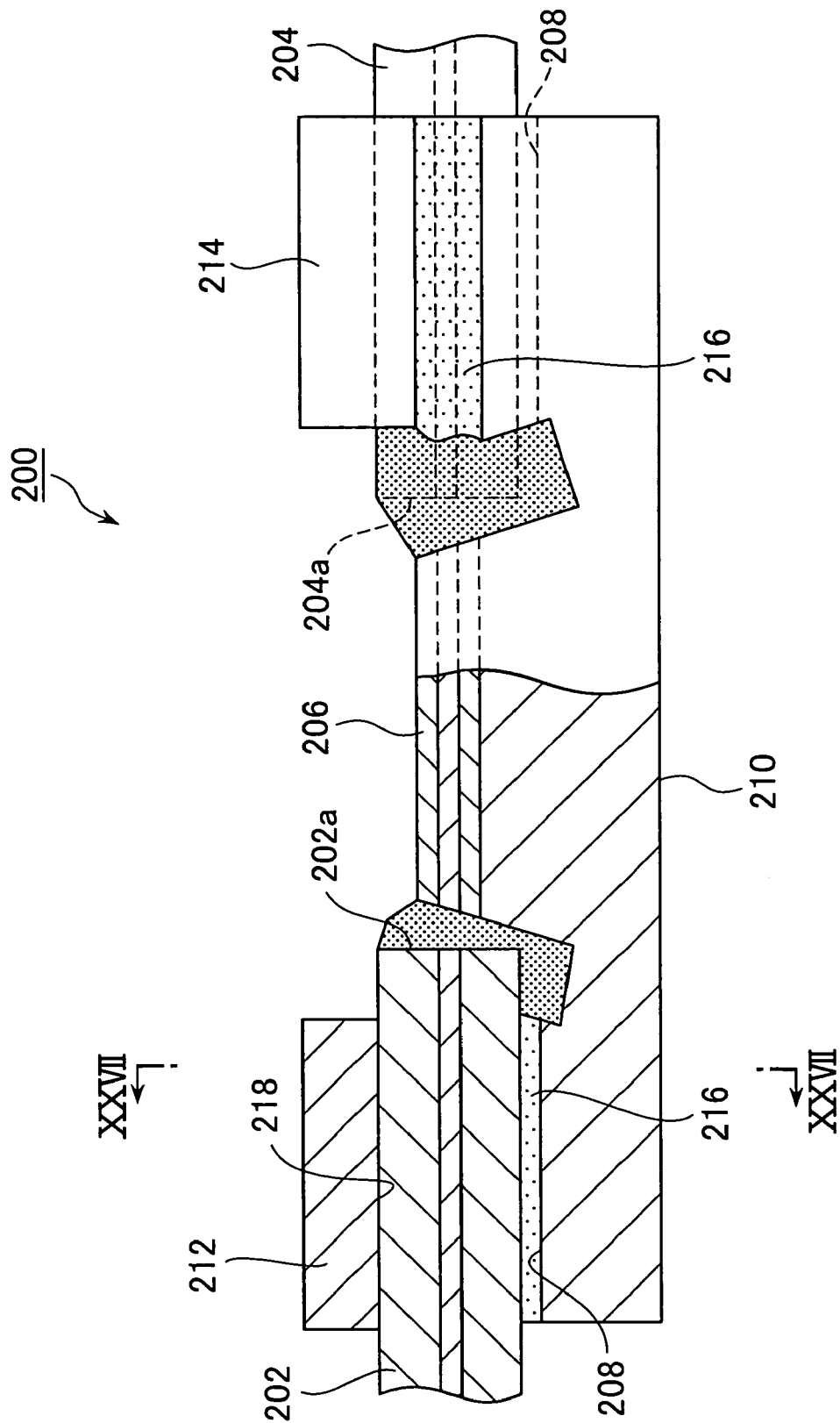
FIG. 26 is a partially cross-sectional front view of an optical element combination structure in the prior art.
Figure 27:
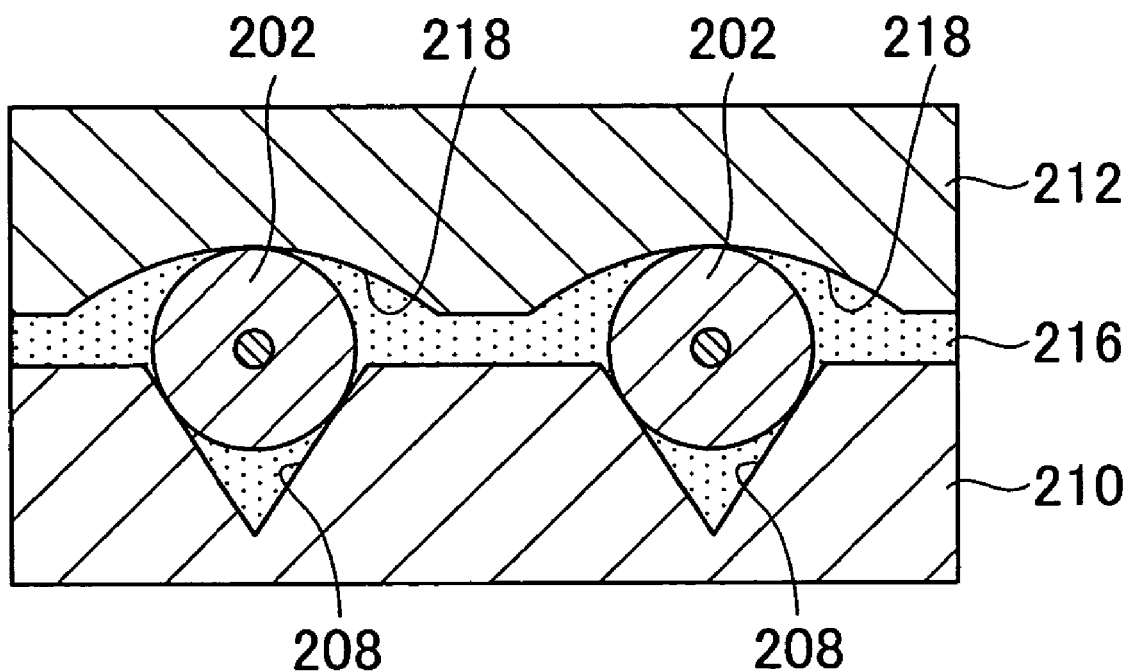
FIG. 27 is a cross-sectional view taken along the line XXVII -XXVII in FIG. 26.

FIG. 25 is a graph showing the fluctuation of coupling loss when a high-temperature high-humidity test (85° C. and 85% RH) took place in the same example as that in FIG. 22, in which the adhesive thickness is 20 μm. As can be seen from FIG. 25, the fluctuation of coupling loss was within ±0.2 dB over a period of 5000 hours. It should be noted that a direction of a vertical scale in FIG. 25 is defined as negative when the fluctuation of coupling loss increases after the high-temperature high-humidity test.

The embodiments of the optical fiber structure according to the second aspect of the present invention have been explained, but the present invention is not limited to the above-mentioned embodiments according to the second aspect and it is apparent that the embodiments can be changed within the scope of the present invention set forth in the claims.

In the above-mentioned embodiments according to the second aspect of the present invention, the optical fiber structure according to the present invention is explained as being optical element combination structures 101, 150, 170 in which the V-shaped cross-sectional grooves and the optical waveguide are integrally formed. However, the optical fiber structure may be an optical fiber array, an optical element combination structure in which an optical fiber array and an optical waveguide are coupled by an adhesive, or other things.

Further, in the above-mentioned embodiments according to the second aspect of the present invention, the optical element combination structures 101, 150, 170 are explained being as an optical coupler having two upstream optical fibers 102 and one downstream optical fiber 104. However, the respective numbers of the upstream fibers 102 and the downstream fibers 104 are arbitrary. For example, if the number of the upstream fibers 102 is one, the number of the downstream fibers 104 is two, and if the structure of the waveguide 106 is modified accordingly, the optical fiber structure would be formed as an optical splitter.

In the above-mentioned first and second embodiments according to the second aspect of the present invention, the contact surfaces 134 of the holding blocks 112, 114, 152, 154, 172, 174 are curved and the opposite surfaces 136 facing to the upper surface 122 of the substrate 110 are provided on the opposed sides of the each contact surface 134. However, shapes of the contact surface 134 and the opposed surface 136 are arbitrary so long as the holding blocks 112, 114, 152, 154, 172, 174 can contact the fibers 102, 104 and push them against the substrate 110. For example, the contact surface 134 and the opposed surface 136 may define a single flat or curved surface or a step may be formed between the contact surface 134 and the opposed surface 136.

Further, in the above-mentioned first and second embodiments according to the second aspect of the present invention, the lower surface 138 of the intermediate portions 132*a*-132*d* of the holding blocks 112, 114, 152, 154 is flat. However, a shape of the lower surface 138 is arbitrary so long as the lower surface 138 is spaced from the fibers 102, 104. For example, the lower surface 138 may be curved to cover the fibers 102, 104 or may be continuously connected to the opposed surface 136 of the contact portions 130*a*-130*e* adjacent to the lower surface 138.

Further, in the above-mentioned third embodiment according to the second aspect of the present invention, the upper surface 182 of the intermediate portion 180*a* of the substrate 110 is flat. However, a shape of the upper surface 182 is arbitrary so long as the upper surface 182 is spaced from the fibers 102, 104. For example, the upper surface 182 may be curved to cover the fibers 102, 104 or may be continuously connected to the upper surface 122 of the grooved portions 180a, 180b adjacent to the upper surface 122.

In the holding blocks 112, 114, 152, 154 of the first and second embodiments according to the second aspect of the present invention, the number of the contact portions 130a-130e is arbitrary, but preferably at least two contact portions are provided. By employing at least two contact portions, the holding blocks 112, 114, 152, 154 can be fixed to the substrate stably and stresses imposed on the fibers 102, 104 by the adhesive 116 due to a temperature change can be decreased. Further, it is not necessary for the contact portions 130a-130e to be provided at longitudinally opposed ends of the holding blocks 112, 114, 152, 154, and instead the intermediate portions 132a-132d can be provided at these longitudinally opposed ends. Longitudinally lengths of the contact portions 130a-130e are arbitrary so long as the optical fiber structure meets a predetermined value of coupling loss.

In the first and second embodiments according to the second aspect of the present invention, the contact portion 130a formed closest to the end surfaces 102a, 104a of the fibers 102, 104 is preferably as close to them as possible. However, the contact portion 130a can be placed away from the end surfaces 102a, 104a of the fibers, as explained in the above-mentioned embodiments according to the second aspect so long as the optical fiber structure meets a predetermined value of coupling loss.

The above-mentioned alternatives regarding the contact portions 130a-130e of the first and second embodiments according to the second aspect can be similarly applied to the grooved portions 180a, 180b of the third embodiment according thereto.

What is claimed is:

1. An optical element combination structure in which an optical fiber and an optical waveguide are combined with each other comprising:
   an optical fiber and
   a substrate on which an optical waveguide to be aligned with the optical fiber is formed;
   wherein the substrate has a V-shaped cross-sectional groove opening upward and formed so that, when the optical fiber is disposed onto the V-shaped cross-sectional groove, the optical fiber and the optical waveguide are aligned with each other, and a recess forming a space on a waveguide side relative to the V-shaped cross-sectional groove; the space opening upward and extending downward beyond the V-shaped cross-sectional groove;
   wherein the optical fiber is disposed onto the V-shaped cross-sectional groove so that a tip of the optical fiber protrudes into the recess, and is secured to the V-shaped cross-sectional groove with a fiber adhesive;
   wherein the tip of the optical fiber and the optical waveguide are coupled to each other with a fiber-coupling agent with which the recess and a space between the optical fiber and the optical waveguide are filled; and
   wherein the substrate further has an upper surface on which the V-shaped cross-sectional groove is formed;
   further comprising a holding member disposed to sandwich the optical fiber with the upper surface and spaced from the upper surface, the holding member having a wide groove which is disposed over the optical fiber and is wider than an outer diameter of the optical fiber;
   wherein, with the fiber adhesive, a space between the wide groove and the optical fiber and a space between the holding member and the upper surface are filled.

2. An optical element combination structure according to claim 1,
   wherein the fiber adhesive and the fiber-coupling agent are the same adhesives.

3. An optical element combination structure according to claim 1,
   wherein values of elastic modulus of the fiber adhesive and the fiber-coupling agent are within a range of 0.01-0.5 GPa and values of coefficient of linear expansion thereof are within a range of 40-300 ppm/° C.

4. An optical element combination structure according to claim 1,
   wherein values of viscosity of the fiber adhesive and the fiber-coupling agent are within a range of 100-1,000 mPa·s.

5. An optical element combination structure according to claim 1,
   further comprising a sealer applied over the tip of the optical fiber and the fiber-coupling agent,
   wherein a value of elastic modulus of the sealer is grater than those of elastic modulus of the fiber adhesive and the fiber-coupling agent.

6. An optical element combination structure according to claim 5, wherein the fiber adhesive and the fiber-coupling agent are the same adhesive.

7. An optical element combination structure according to claim 5,
   wherein values of elastic modulus of the fiber adhesive and the fiber-coupling agent are within a range of 0.01-3.0 GPa and values of coefficient of linear expansion thereof are within a range of 40-300 ppm/° C., and
   wherein a value of elastic modulus of the sealer is within a range of 5-20 GPa and a value of coefficient of linear expansion thereof is within a range of 5-30 ppm/° C.

8. An optical element combination structure according to claim 5,
   wherein values of viscosity of the fiber adhesive and the fiber-coupling agent are within a range of 100-8,000 mPa·s and a value of viscosity of the sealer is within a range of 10,000-200,000 mPa·s.

9. An optical element combination structure according to claim 1,
   wherein the fiber adhesive is a compound different from the fiber-coupling agent and a value of elastic modulus of the fiber-coupling agent is smaller than that of elastic modulus of the fiber adhesive.

10. An optical element combination structure according to claim 9,
    wherein the fiber-coupling agent is further applied over the tip of the optical fiber to seal the optical fiber and the optical waveguide.

11. An optical element combination structure according to claim 9,
    wherein a value of elastic modulus of the fiber-coupling agent is within a range of $10^{-6}$-$10^{-3}$ GPa and a value of coefficient of linear expansion thereof is within a range of 100-400 ppm/° C., and
    wherein a value of elastic modulus of the fiber adhesive is within a range of 0.01-3.0 GPa and a value of coefficient of linear expansion thereof is within a range of 20-100 ppm/° C.

12. An optical element combination structure according to claim 9, wherein a value of viscosity of the fiber-coupling agent is within a range of 1,000-5,000 mPa·s and a value of viscosity of the fiber adhesive is within a range of 5,000-100,000 mPa·s.

13. An optical fiber structure comprising;
    at least one optical fiber extending longitudinally and having an end surface;

a substrate having at least one V-shaped cross-sectional groove to receive and position the at least one optical fiber;
a holding member for covering the optical fiber from its upper side and pushing it against the substrate; and
an adhesive with which spaces between any two of the substrate, the optical fiber and the holding member are filled to fix them to each other;
wherein the holding member has a first contact portion, an intermediate portion and a second contact portion, which portions are disposed in turn in the longitudinal direction from a fiber-end-surface side,
wherein, when the optical fiber is pushed against the substrate with the holding member, the first and second contact portions of the holding member contact the optical fiber and push it onto the substrate while the intermediate portion is spaced from the optical fiber via the adhesive,
wherein the first contact portion of the holding member has a contact surface contacting the optical fiber to push it against the substrate, and opposing surfaces formed on the opposed sides relative to the optical fiber and facing the substrate, and
wherein the contact surface is defined as a recess relative to the opposing surfaces.

14. An optical fiber structure according to claim 13, wherein a plurality of the optical fibers are disposed parallel to each other and a plurality of the V-shaped cross-sectional grooves corresponding to the respective optical fibers are formed on the substrate.

15. An optical fiber structure according to claim 13, wherein distances between the opposing surfaces on the opposed sides relative to the recess and the substrate are within a range of 20-40 µm.

16. An optical fiber structure according to claim 13, wherein a value of viscosity of the adhesive is within a range of 10,000-50,000 mPa·s.

17. An optical fiber structure according to claim 13, wherein a value of elastic modulus of the adhesive is within a range of 0.01-3.0 GPa and a value of coefficient of linear expansion thereof is within a range of 20-100 ppm/° C.

18. An optical fiber structure according to claim 13, wherein a longitudinal length of the first contact portion is 0.5-3 times of a diameter of the optical fiber.

19. An optical fiber structure according to claim 13, wherein the substrate has an upper surface provided with the V-shaped cross-sectional groove, and
wherein the intermediate portion has a flat lower surface opposed to the upper surface of the substrate and extending across the optical fiber.

20. An optical fiber structure comprising;
at least one optical fiber extending longitudinally and having an end surface;
a substrate having at least one V-shaped cross-sectional groove to receive and position the at least one optical fiber;
a holding member for covering the optical fiber from its upper side and pushing it against the substrate; and
an adhesive with which spaces between any two of the substrate, the optical fiber and the holding member are filled to fix them to each other;
wherein the substrate has a first grooved portion, an intermediate portion and a second grooved portion, which portions are disposed in turn in the longitudinal direction from a fiber-end-surface side along a same optical fiber,
wherein the V-shaped cross-sectional groove is formed on the first and second grooved portions and the intermediate portion is spaced from the optical fiber via the adhesive.

21. An optical fiber structure according to claim 13, wherein the optical fiber structure is an optical fiber array.

22. An optical fiber structure according to claim 13, wherein the optical fiber structure is an optical element combination structure in which the V-shaped cross-sectional groove and an optical waveguide are integrally coupled to each other and an optical fiber disposed onto the V-shaped cross-sectional groove and the optical waveguide are combined with each other.

23. An optical fiber structure according to claim 13, wherein the optical fiber structure is an optical element combination structure in which the optical fiber array and the optical waveguide are coupled to each other.

24. An optical fiber structure according to claim 20, wherein the optical fiber structure is an optical fiber array.

25. An optical fiber structure according to claim 20, wherein the optical fiber structure is an optical element combination structure in which the V-shaped cross-sectional groove and an optical waveguide are integrally coupled to each other and an optical fiber disposed onto the V-shaped cross-sectional groove and the optical waveguide are combined with each other.

26. An optical fiber structure according to claim 20, wherein the optical fiber structure is an optical element combination structure in which the optical fiber array and the optical waveguide are coupled to each other.

27. An optical fiber structure according to claim 20, wherein said adhesive has a viscosity within a range of 10,000-50,000 mPa·s.

28. An optical fiber structure according to claim 27, wherein said adhesive has an elastic modulus in a range of 0.01-3.0 GPa, and has a coefficient of linear expansion in a range of 20-100 ppm/° C.

29. An optical fiber structure according to claim 20, wherein said intermediate portion has a flat lower surface extending across the optical fiber.

* * * * *